United States Patent

[11] 3,612,837

| [72] | Inventor | William E. Brandau |
|---|---|---|
| | | Westwood, N.J. |
| [21] | Appl. No. | 820,428 |
| [22] | Filed | Apr. 30, 1969 |
| [45] | Patented | Oct. 12, 1971 |
| [73] | Assignee | The Bendix Corporation |

[54] AIRCRAFT STRIKE ASSURANCE SYSTEM
37 Claims, 25 Drawing Figs.

[52] U.S. Cl. .................................................. 235/150.2,
235/150.21, 235/150.26, 235/150.27, 235/189
[51] Int. Cl. ..................................................... G06g 7/70,
G06g 7/22
[50] Field of Search ........................................... 235/150.2,
150.21, 150.26, 150.27; 73/178

[56] References Cited
UNITED STATES PATENTS

| 2,955,464 | 10/1960 | Elwell................................. | 235/150.2 |
| 2,992,558 | 7/1961 | Newell et al. ...................... | 235/150.21 X |
| 3,108,182 | 10/1963 | Gray et al. ......................... | 235/150.26 X |
| 3,504,165 | 3/1970 | Richardson et al. ............... | 235/150.27 X |

*Primary Examiner*—Malcolm A. Morrison
*Assistant Examiner*—R. Stephen Dildine, Jr.
*Attorneys*—S. H. Hartz and Plante, Hartz, Smith and Thompson

ABSTRACT: A system for computing all necessary flight commands for successfully completing a mission, including a forecast of fuel reserves and time to each target from planned parameters by combining fuel management data and inertial navigation data. The system provides for primary and alternate targets and is adaptable to inflight mission alterations and unforeseen events such as weather changes and engine failure.

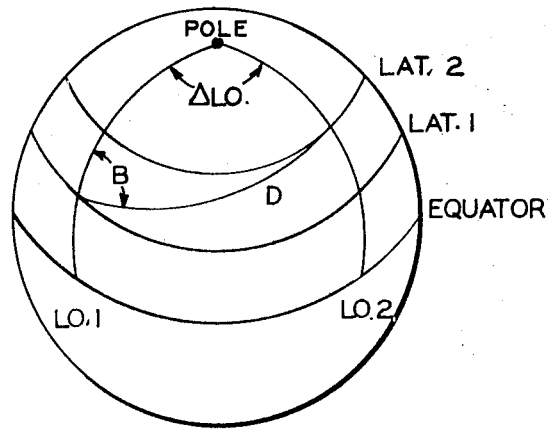
FIG. 3
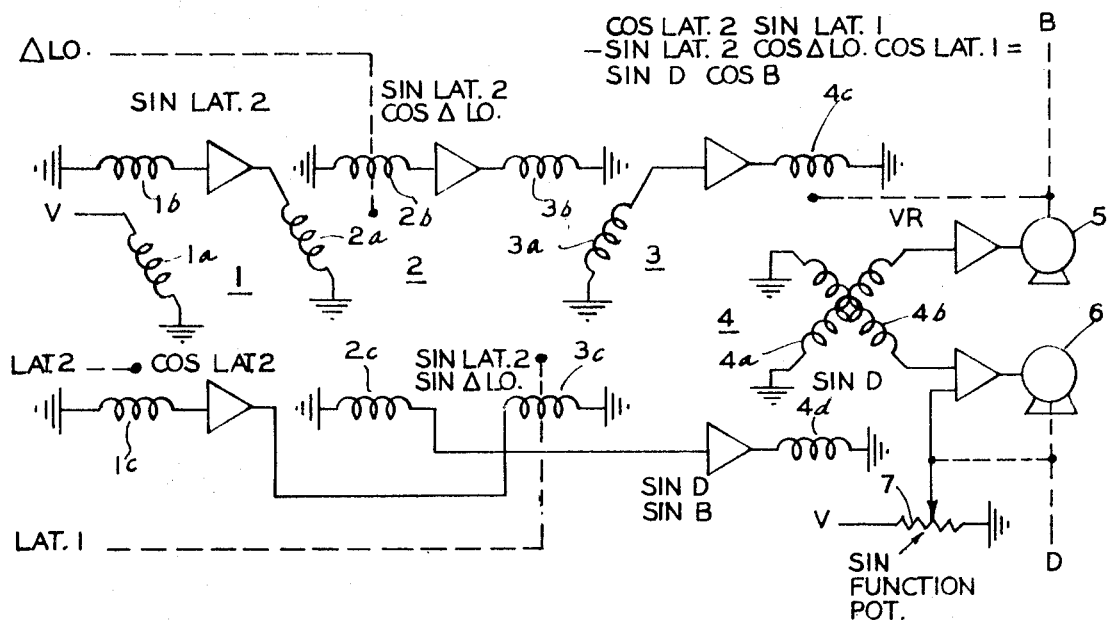
FIG. 4
INVENTOR.
WILLIAM E. BRANDAU
ATTORNEY

MISSION DEFINITION PANEL

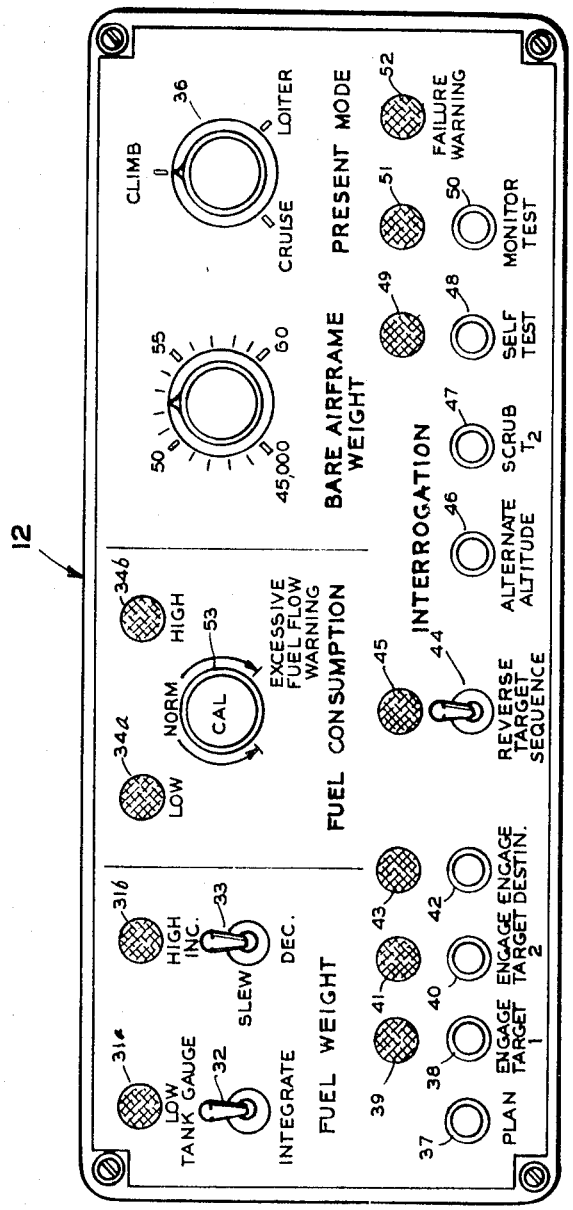
FIG. 7
INVENTOR.
WILLIAM E. BRANDAU
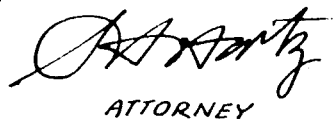
ATTORNEY

PRESENT POSITION INDICATOR

PATENTED OCT 12 1971 3,612,837
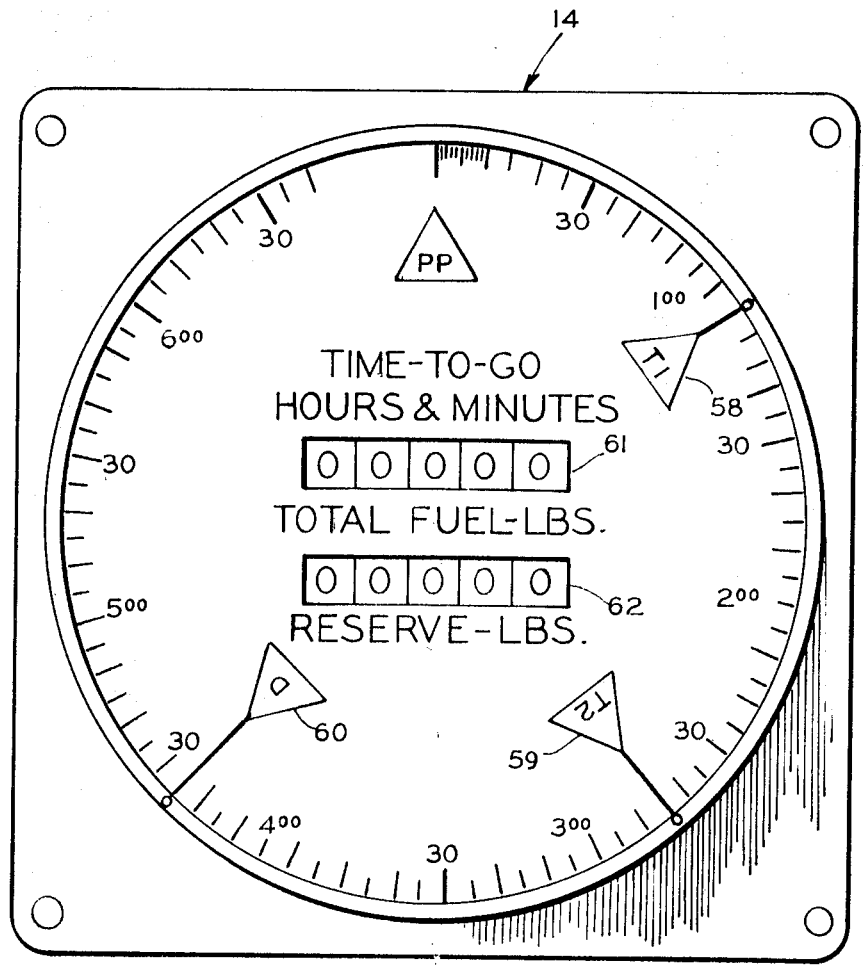
RESERVE FUEL INDICATOR
FIG. 9
INVENTOR.
WILLIAM E. BRANDAU
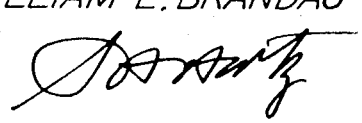
ATTORNEY

HEADING COMMAND INDICATOR

INVENTOR.
WILLIAM E. BRANDAU

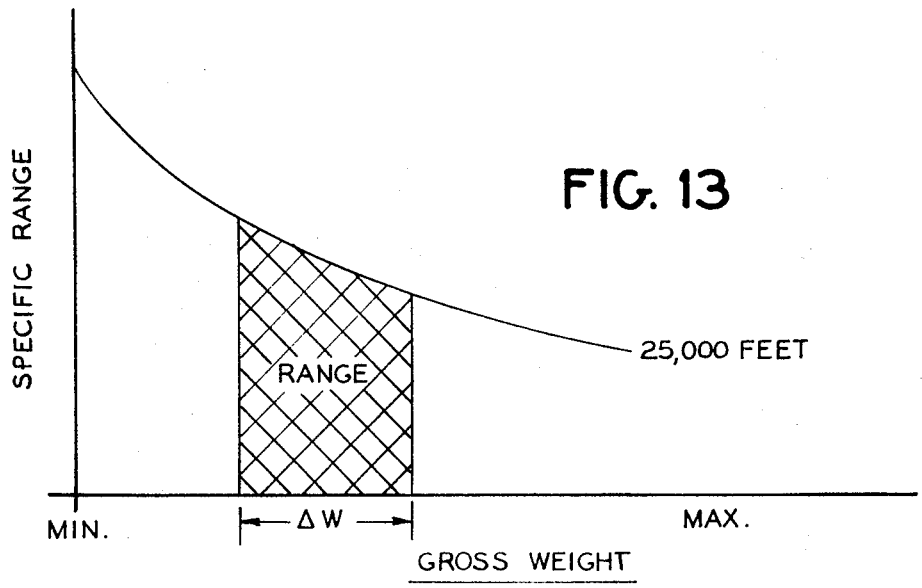
FIG. 13
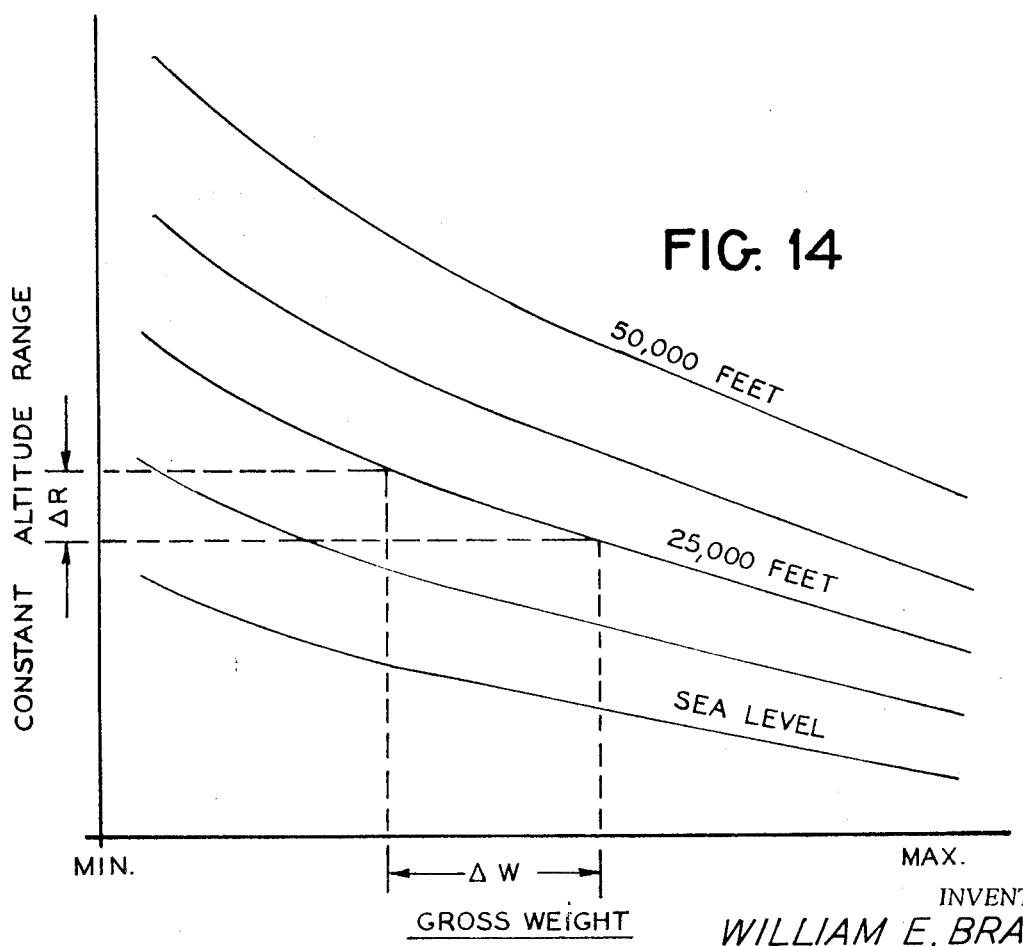
FIG. 14
INVENTOR.
WILLIAM E. BRANDAU
BY
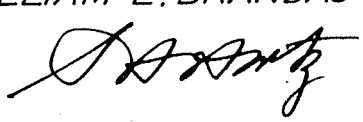
ATTORNEY

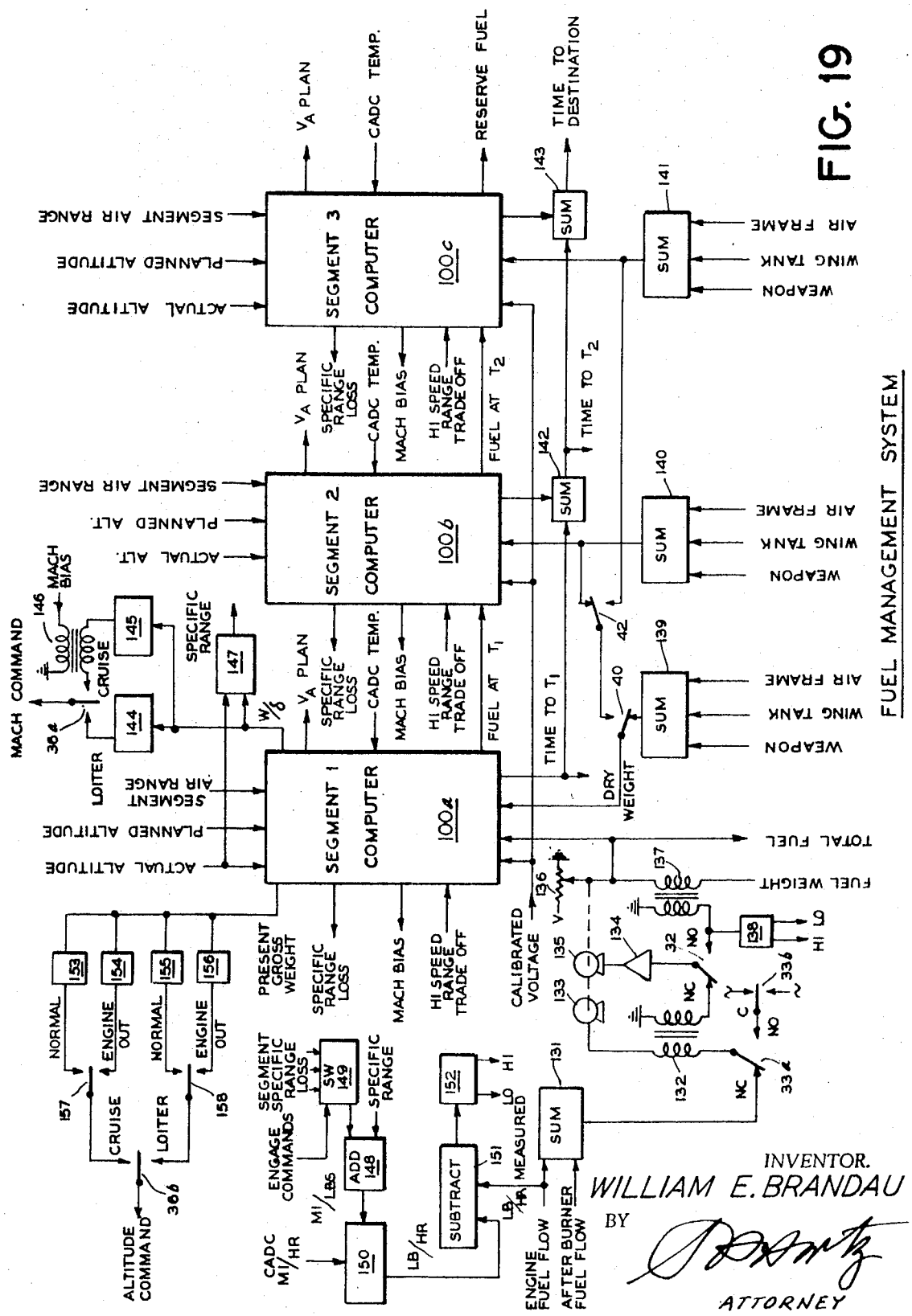

SWITCHING CIRCUIT

AIRCRAFT STRIKE ASSURANCE SYSTEM

BACKGROUND OF THE INVENTION

1. Field of the Invention

This invention relates to an aircraft computer system and, more particularly, to a system for computing flight information needed to complete a complex mission having several targets.

2. Description of the Prior Art

Heretofore pilots have not had a complete mission-planning system available. Various fuel management systems were available to provide the pilot with the best flight parameters for maximum engine efficiency including rate of fuel consumption and remaining fuel. Navigational systems were also available to guide the pilot to a mission target and to indicate the required range to complete a mission.

Fuel management data is computed on the basis of air miles and air track of an aircraft which is affected by wind conditions. Modern inertial navigation systems provide data based on a ground track of the aircraft. Ground track and air track data are not directly compatible. Hence in the prior art it was necessary for the pilot to manually convert ground track data into air track data using wind considerations and then use the fuel management data to calculate remaining flight time and potential range of the aircraft.

If a change in mission plans was encountered it was necessary for the pilot to expend considerable time and effort in determining if the aircraft had the capability to reach primary targets or even alternate targets.

SUMMARY OF THE INVENTION

The present invention combines both fuel management and inertial navigation concepts into a unique system for real time planning and control of a complex mission.

The system consists of two subsystems, a fuel management subsystem and a navigational subsystem. The navigational subsystem receives signals corresponding to coordinates of four mission points namely a point of departure, two targets, and a destination. Signals corresponding to compass heading, air speed, inertial ground speed and estimated wind velocity and direction are also supplied to the navigational subsystem. The navigational subsystem computes and provides signals corresponding to target bearing, ground range, actual and desired heading and air range.

In FIG. 1 there is shown a pair of vector diagrams forming two similar triangles. One is a velocity vector diagram and the other is a distance vector diagram corresponding to the distance between two mission points or a mission segment. In the diagrams three sides of the triangles are known: $V_A$, airspeed; $V_G$, ground speed; and $D_G$, ground distance. The navigational subsystem solves the similar triangles for the unknown side $D_A$ corresponding to air distance or air range.

The fuel management subsystem receives signals corresponding to airspeed, air range, initial total fuel, fuel flow, airframe weight and desired flight parameters. The subsystem computes and displays all the data necessary for the pilot to achieve maximum aircraft efficiency. The system also continuously computes and displays reserve fuel based on initial fuel, consumed fuel and the fuel required to complete the remainder of the mission.

The system has provisions for substituting alternate targets in the place of previously selected primary targets during the mission and providing an immediate readout of reserve fuel whereby the pilot can determine if he has sufficient fuel to engage an alternate target.

One object of the invention is to combine a fuel management subsystem with an inertial navigation subsystem to provide a system for complete mission planning and control.

Another object of the invention is to provide a system which computes all essential data for successful completion of a complex mission including present position, range to each mission point, total range, time to each mission point, total time, total fuel, reserve fuel, target bearing, desired heading, actual heading, wind velocity, wind direction, optimum altitude, optimum airspeed, and mach number.

Another object of the invention is to provide a system that continuously updates the essential data to correct for prior mission deviations.

Another object of the invention is to provide means for inserting alternate targets, reversing target sequence or for scrubbing a previously selected target during a mission and immediately determining the impact on the mission parameters.

Another object of the invention is to provide a warning if the fuel is dangerously low, the fuel consumption is excessive or if gross discrepancies exist between fuel tank information and integrated fuel flow data. Such conditions may be evidence of battle damage, fuel leaks, trim errors or dirty airplane skin.

The foregoing and other objects and advantages of the invention will appear more fully hereinafter from a consideration of the detailed description which follows, taken together with the accompanying drawings wherein an embodiment of the invention is illustrated by way of example.

DESCRIPTION OF THE DRAWINGS

In the drawings in which corresponding numerals indicate corresponding parts in the respective figures:

FIG. 3 shows spherical coordinates for a typical mission segment.

FIG. 4 shows a resolver chain constructed in accordance with the present invention.

FIG. 7 shows a Control Panel used with the present invention.

FIG. 9 shows an indicator for displaying time to go, remaining fuel and fuel reserve.

FIG. 13 is a graph of a specific range as a function of gross weight showing range potentially as the area under the curve corresponding to a change in gross weight.

FIG. 14 shows a collection of range potential curves for specified altitudes at various gross weights.

FIG. 19 is a block diagram of a fuel management subsystem.

DESCRIPTION OF THE INVENTION

Figure 2:
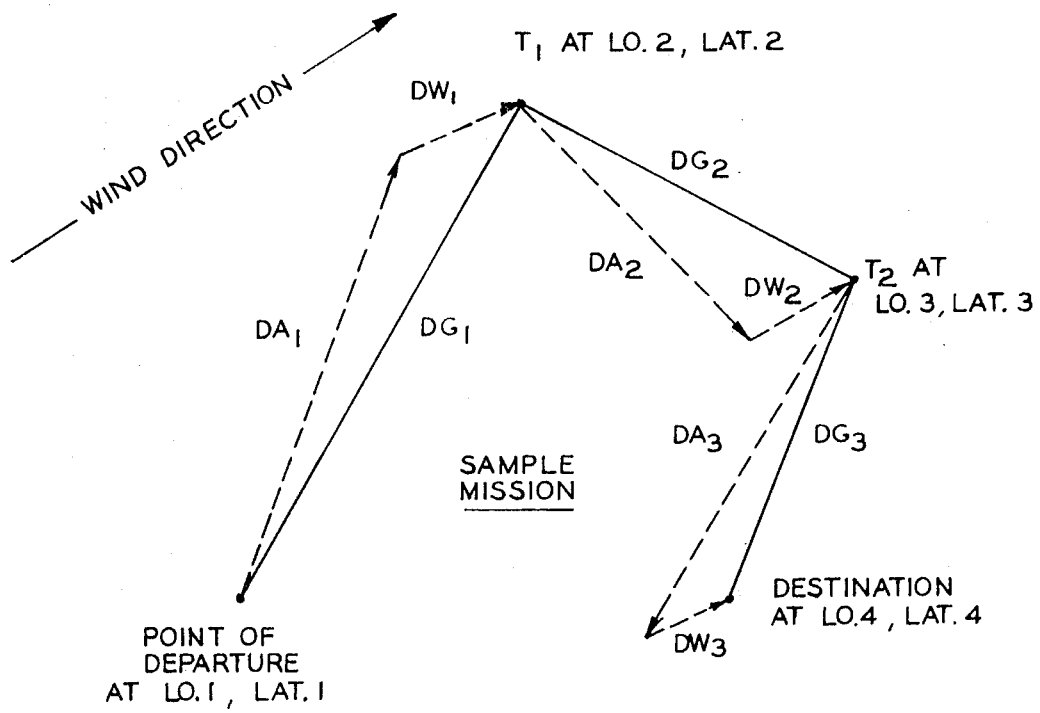
FIG. 2 is a vector diagram of a mission having two targets and a remote destination.

Referring to FIG. 2, there is shown a distance vector diagram of a typical mission having a point of departure, two targets $T_1$ and $T_2$, and a remote destination. The point of departure is located at a longitude, Lo 1, and a latitude, Lat 1, the first target $T_1$ is located at Lo 2 and Lat 2, the second target $T_2$ is located at Lo 3 and Lat 3 and the destination is at Lo 4 and Lat 4. The mission is divided into three separate segments represented by ground distances $D_G$ 1, $D_G$ 2 and $D_G$ 3. Each ground distance has a corresponding air track having two components, a true airspeed distance $D_A$ and a wind distance $D_W$.

Target bearing and range for each mission segment is computed separately. Referring to FIG. 3, there is shown spherical coordinates for a segment having a distance D and a bearing B between two points having coordinates Lo 1, Lat 1 and Lo 2, Lat 2.

Referring to FIG. 4, there is shown a resolver chain having four resolvers 1, 2, 3 and 4. Resolver 1 has a rotor 1a excited by a unity voltage V and rotated to a position corresponding to Lat 2. The resolver has two stators 1b and 1c having induced voltages corresponding to Sin Lat 2 and Cos Lat 2, respectively. Resolver 2 has a rotor 2a excited by the Sin Lat 2 voltage from stator 1b of resolver 1 and rotated to a position corresponding to Δ Lo the difference between Lo 1 and Lo 2. Resolver 2 has two stators 2b and 2c having induced voltages of Sin Lat 2 Cos Δ Lo and Sin Lat 2 Sin Δ Lo, respectively. Resolver 3 has one stator 3b excited by the Sin Lat 2 Cos Δ Lo voltage from stator 2b of resolver 2 and a second stator 3c excited by the Cos Lat 2 voltage from stator 1c of resolver 1. Resolver 3 also has a rotor 3a rotated to a position corresponding to Lat 1 and having an induced voltage corresponding to Cos Lat 2 Sin Lat 1 − Sin Lat 2 Cos Δ Lo Cos Lat 1.

Referring to FIG. 3 and using standard spherical equations it can be shown that:

Sin D Sin B = Sin Lat 2 Sin Δ Lo     (1)
Sin D Cos B = Cos Lat 2 Sin Lat 1 −
Sin Lat 2 Cos Δ Lo Cos Lat 1     (2)

Resolver 4 has two stators 4c and 4d, stator 4c is excited by the voltage corresponding to Sin D Cos B and stator 4d by the voltage corresponding to Sin D Sin B.

A resolver having two stators excited by voltages X and Y and a rotor positioned at an angle $\theta$ will have a voltage induced in the rotor equal to:

$V_R = -X \sin\theta + Y \cos\theta$     (3)

Substituting the stator excitations of resolver 4 into equation (3) for X and Y a voltage $V_R$ induced into rotor 4a of resolver 4 is:

$V_{R_{4a}} = -\sin D \cos B \sin\theta + \sin D \sin B \cos\theta$     (4)

When the rotor of resolver 4 is positioned at an angle $\theta$ equal to B, equation (4) becomes:

$V_{R_{4a}} = -\sin D \cos B \sin B + \sin D \sin B \cos B = 0$     (5)

If $\theta$ does not equal B, voltage $V_{R_{4a}}$ excites a motor 5 which is drivably connected to rotor 4a and positions the rotor to an angle B corresponding to the bearing between the two points shown in FIG. 3. The angular position of the shaft of motor 5 then corresponds to bearing B.

Resolver 4 has a rotor 4b positioned at right angles to rotor 4a. The voltage induced into rotor 4b at an angle of B −90° equals:

$V_{R_{4b}} = -\sin D \cos B \sin(B-90) + \sin D \sin B \cos(B-90)$     (6)

$V_{R_{4b}} = -\sin D \cos B (-\cos B) + \sin D \sin B (\sin B)$     (7)

$= \sin D \cos^2 B + \sin D \sin^2 B$     (8)
$= \sin D (\sin^2 B + \cos^2 B)$     (9)
$= \sin D$ Rotor 4b voltage is used to excite a motor 6 which drives a wiper of a follow up potentiometer 7. Potentiometer 7 is contoured to a Sin function so that when the wiper is moved to correspond to D and the potentiometer is excited by the unity voltage V a wiper voltage corresponding to Sin D is provided. Thus motor 6 positions the wiper of potentiometer 7 to a position corresponding to the distance D between the two points shown in FIG. 3 and the angular position of the shaft of motor 6 corresponds to distance D.

Figure 5:
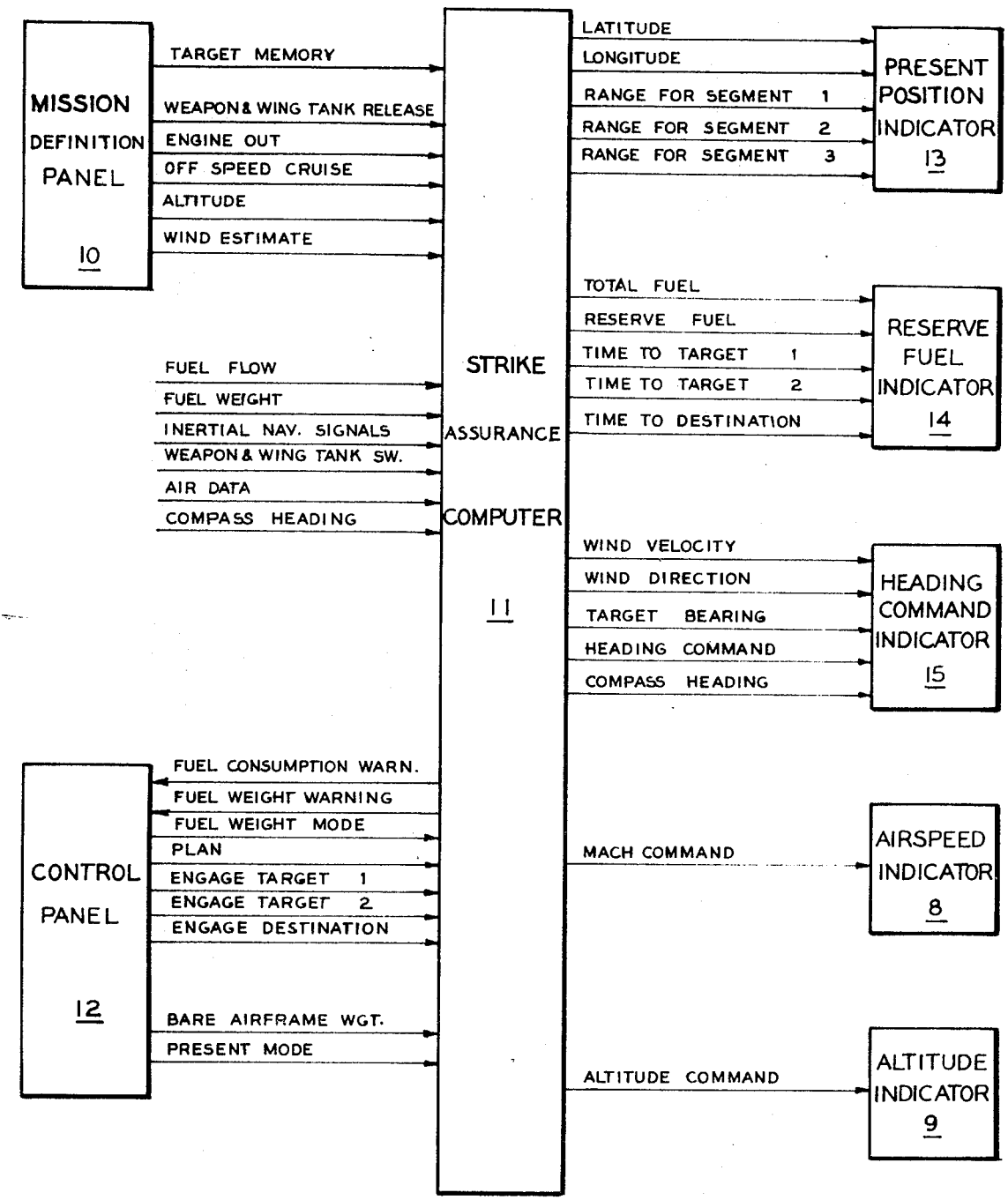
FIG. 5 is a block diagram of a system constructed according to the present invention.

Referring to FIG. 5, there is shown a block diagram of a system constructed in accordance with the invention. A Mission Definition Panel 10 is used to insert and recall target coordinates and to insert segment parameters such as altitude, off speed cruise and estimated wind. The Mission Definition Panel is connected to a Strike Assurance Computer 11 and provides signals thereto corresponding to the inserted parameters.

A Control Panel 12 is used to insert aircraft parameters and system control signals into the system. It is also responsive to fuel consumption and fuel weight warning signals from the Strike Assurance Computer for providing a warning. The Strike Assurance Computer also receives signals corresponding to fuel flow, fuel weight, inertial navigation signal, weapon and wing tank status, air data and compass heading and provides signals corresponding to latitude, longitude and range to a Present Position Indicator 13. A Reserve Fuel Indicator 14 receives signals from the Strike Assurance Computer corresponding to the total fuel, reserve fuel and time to go. A Heading Command Indicator 15 receives signals from the Strike Assurance Computer corresponding to wind velocity, wind direction, bearing, heading command and actual heading. The Strike Assurance Computer provides signals corresponding to mach and altitude commands to an airspeed indicator 8 and an altitude indicator 9, respectively.

Figure 6:
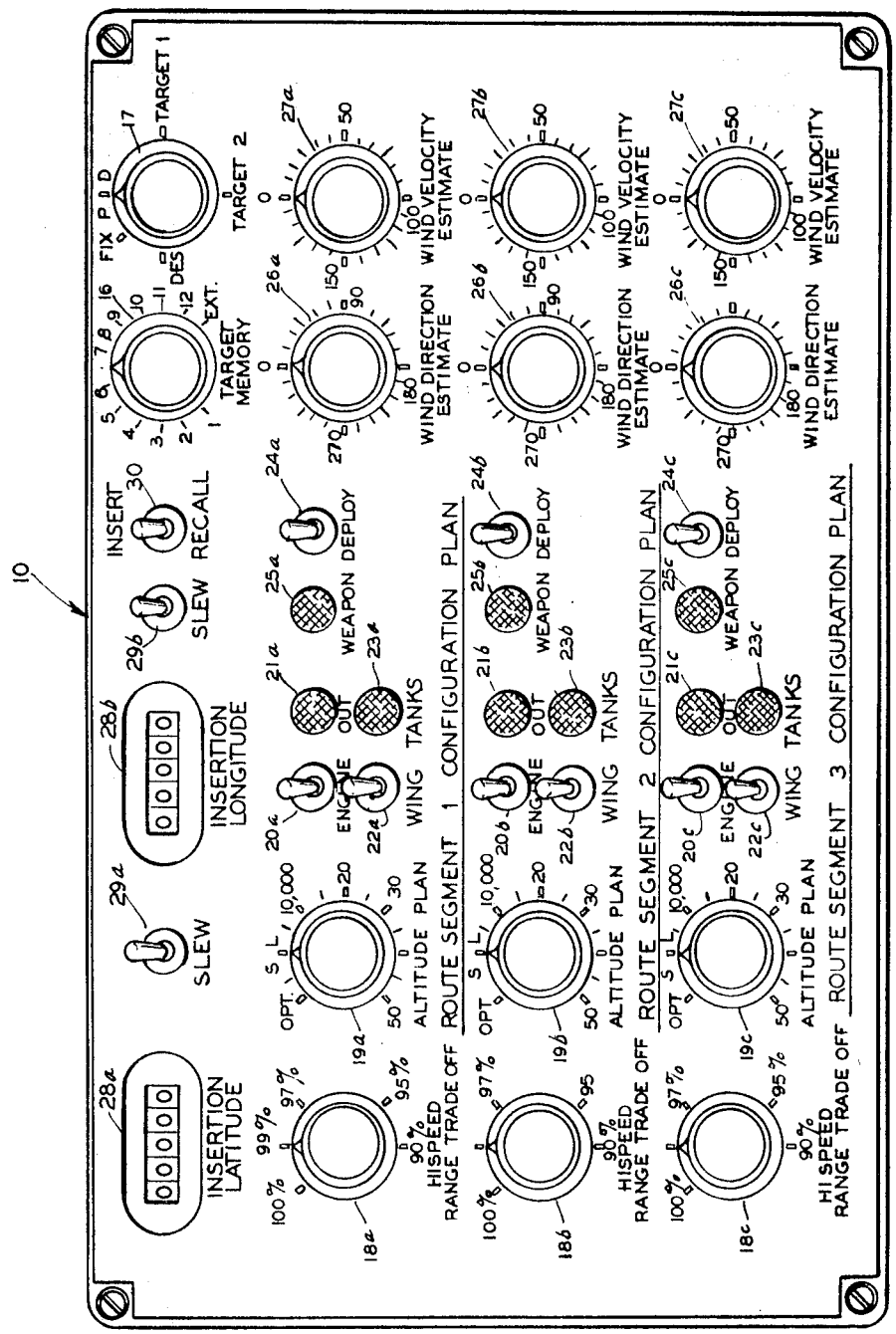
FIG. 6 shows a Mission Definition Panel used with the present invention.

Mission Definition Panel 10 shown in FIG. 6 has a pair of digital indicators 28a and 28b to indicate latitude and longitude, respectively, of inserted or recalled mission points. Switches 29a and 29b are used to command the system to drive indicators 28a and 28b to desired coordinates for a mission point. Switch 30 is used to command insertion or recall of a point for readout on indicators 28a and 28b. Switch 16 is provided to select a target from a bank of permanently stored targets or an inserted target. Switch 17 is used to select a mission point of either departure, target $T_1$, target $T_i$ or destination for insertion of coordinates from either the permanent memory bank or the indicated coordinates. A Fix position is provided for updating the system while flying over a known location.

Three groups of switches is provided for insertion of segment parameters for each of the three route segments. Only the group for route segment one will be described because corresponding switches in each group serve similar functions. A switch 18a is provided to select a range trade off to achieve a higher airspeed. Switch 19a is provided to command the system to compute fuel requirements based on a selected constant segment altitude or on an optimum segment altitude. A lamp 21a is provided to warn if an engine fails and a switch 20a is used to acknowledge that an engine has failed and to switch the system to single engine computation. A lamp 23a warns that the wing tanks have been dropped and a switch 22a is provided to acknowledge wind tank drop and to adjust the airframe weight to correct for the lost weight. A lamp 25a provides a warning that a weapon has been deployed and switch 24a is used to acknowledge deployment and to adjust airframe weight accordingly. A knob 26a is provided to insert segment wind direction and a knob 27a is used to insert segment wind velocity.

Control Panel 12 shown in FIG. 7 has a pair of warning lamps 31a and 31b to warn of low or high discrepancies in fuel weight indications. A switch 32 is provided to select either a tank gauge mode or an integration mode of determining fuel weight. A switch 33 is provided to adjust a fuel weight indication to the proper initial weight. A pair of lamps 34a and 34b warn of abnormal fuel consumption rates. A knob 53 is provided to calibrate a stored fuel consumption rate for variations between aircraft. A knob 35 is provided to insert bare airframe weight. A switch 36 is provided to select a flight mode of cruise, loiter or climb. The cruise mode provides for maximum range of the aircraft and the loiter mode provides for maximum endurance. The climb position merely interlocks the fuel consumption warning lights and prevents an indication of excessive fuel consumption during climb. A switch 37 is provided to allow the system to accept inserted information prior to the start of a mission and to provide an initial mission plan. A switch 38 is provided to command the system to engage target $T_1$ at the start of the planned mission. Switches 40 and 42 are provided to engage target $T_2$ and the destination respectively. Lamps 39, 41 and 43 indicate which mission point is engaged. Switch 44 is provided to command the system to reverse the target sequence and lamp 45 indicates the target sequence is reversed. Switch 46 is used to interrogate the system to determine the effect of an alternate altitude. Switch 47 is used to command the system to scrub target 2. Switches 48 and 50 are used to implement a self test and a monitor test respectively. Lamps 49 and 51 indicate if the system is in a test mode. Lamp 52 indicates a system failure.

Figure 8:
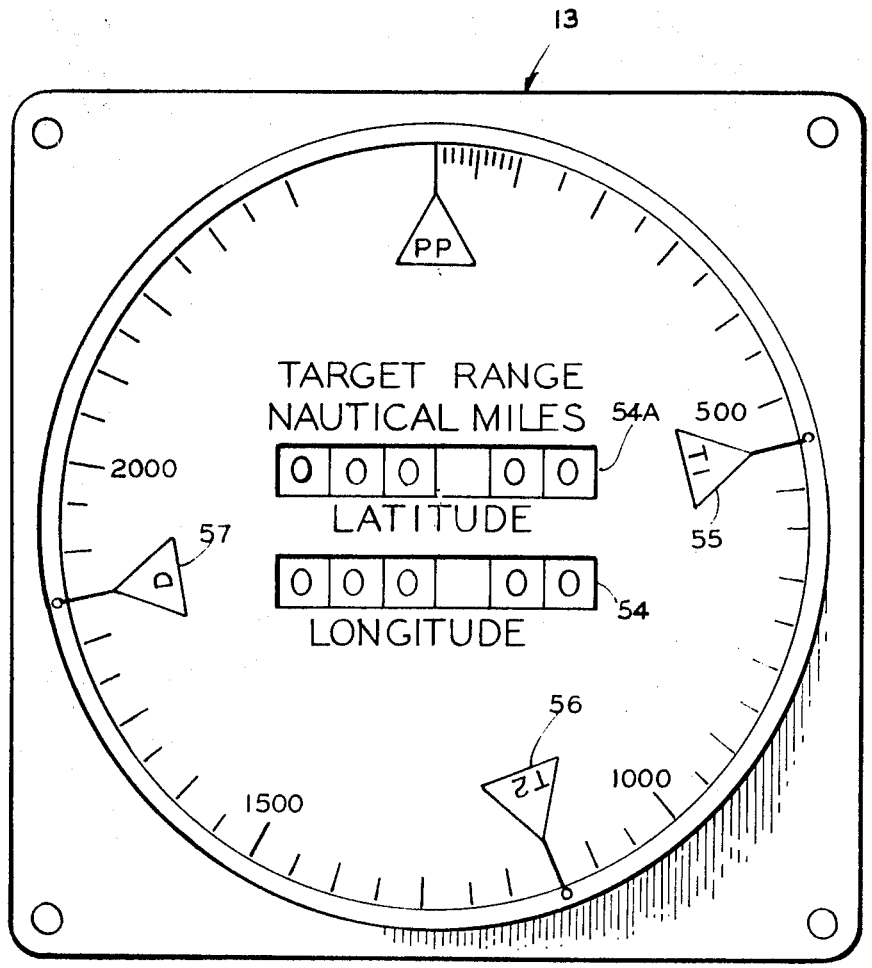
FIG. 8 shows a Present Position Indicator constructed in accordance with the present invention.

FIG. 8 shows Present Position Indicator 13 having a face calibrated in nautical miles. The indicator receives the range signals for each segment and sums the signals to provide signals corresponding to the range to each mission point. Three movable indices 55, 56 and 57 are responsive to the range to each point signal to indicate range to target $T_1$, target $T_2$ and destination respectively. Two digital readouts 54a and 54b show present latitude and longitude, respectively.

FIG. 9 shows Reserve Fuel Indicator 14 having a face calibrated in hours and minutes to indicate time to go. Three movable indices 58, 59 and 60 indicate the time to target 1, target 2 and destination, respectively. Two digital readouts 61 and 62 indicate total fuel in pounds and reserve fuel in pounds, respectively.

Figure 10:
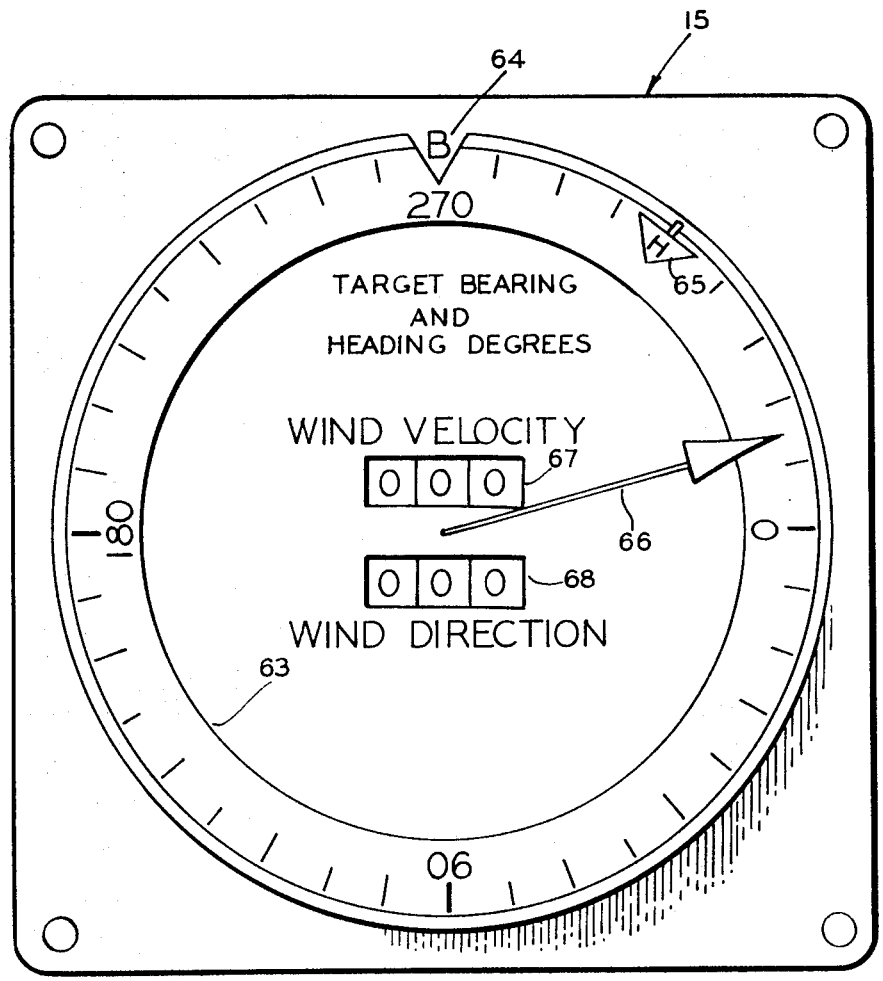
FIG. 10 shows a Heading Command Indicator constructed in accordance with the present invention.

FIG. 10 shows Heading Command Indicator 15 having a rotating ring 63 calibrated in degrees. An index 64 indicates the target bearing. A movable index 65 indicates a heading command. A pointer 66 indicates the actual heading of the aircraft. A pair of digital counters 67 and 68 indicate wind velocity and direction, respectively.

Referring to FIGS. 11A, 11B, 11C and 11D, there is shown a schematic diagram of a navigational subsystem constructed in accordance with the present invention. A target insertion section is used to insert and recall the coordinates of mission points. This section shown in FIG. 11A consists of two identical parts, one for storing latitude and the other for storing longitude. Only one part will be described because the parts are similar in construction and operation.

Four potentiometers 69a are provided for storing voltages corresponding to the latitudes of the mission points. Each potentiometer is excited by a unity voltage V and has a wiper positioned in accordance with the latitude of a mission point to provide a voltage corresponding to the latitude. The wipers are connected to terminals A, B, C and D of a switching circuit 70 shown in FIG. 22. The wipers are drivably connected to a motor 72a through normally disengaged clutches 71a. A transformer 73a has a pair of primary leads connected to terminals E and F of the switching circuit and a secondary winding having one lead grounded and the other connected to a normally open terminal of a deck 30a of switch 30 on Mission Definition Panel 10. Deck 30a has a common terminal connected to motor 72a and a normally closed terminal connected to a common terminal of switch 29a on Mission Definition Panel 10. Switch 29a has two momentary contact terminals connected to voltage sources of opposite phase. Latitude counter 28a on Mission Definition Panel 10 is drivably connected to motor 72a through a normally engaged clutch 75a. A potentiometer 74a is excited by unity voltage V and has a wiper drivably connected to motor 72a. The wiper of potentiometer 74a is connected to terminal G of switching circuit 70 and provides a voltage corresponding to the position of the latitude counter 28a. A target memory 76 has 24 outputs connected to corresponding terminals H on switching circuit 70. Twelve of the outputs provide voltages corresponding to latitudes of stored targets and 12 provide longitude voltages. Clutches 71a and 75a are connected to terminals I, J, K, L and M of switching circuit 70 and are responsive to signals therefrom.

Coordinates stored in the memory 76 are inserted into the system by turning switch 17 on the Mission Definition Panel 10 to a selected mission point. This connects the wiper of a corresponding potentiometer 69a to a primary lead of transformer 73a through a deck 17a of switch 17 in switching circuit 70 and connects a corresponding clutch 71a to a common terminal of a deck 30c of switch 30. Deck 30c has an open terminal connected to a clutch voltage $V_C$. The target coordinates are selected from the stored target by turning switch 16 on the Mission Definition Panel 10 to the selected target. Deck 16a of switch 16 in switching circuit 70 connects the voltage corresponding to the desired latitude coordinate from target memory 76 to the other primary lead of transformer 73a. The coordinate is inserted when switch 30 is turned to the insert position causing the secondary of transformer 73a to be connected to motor 72a through deck 30a of switch 30 and the clutch voltage to be connected to the corresponding clutch through deck 30c of switch 30 resulting in engagement of clutch 71a and disengagement of clutch 75a. Any difference between the coordinate voltage from memory 76 and the potentiometer 69a wiper voltage is induced into the secondary of transformer 73a and causes motor 72a to drive the wiper of potentiometer 69a through clutch 71a to a position where the voltages are equal. Thus the coordinate is stored as a voltage on the wiper of potentiometer 69a.

If the desired target coordinates are not available in target memory 76a they may be inserted into the system by turning slew switch 29a to the proper voltage phase to cause motor 72a to drive counter 28a through normally engaged clutch 75a to the desired latitude. This also causes the wiper of potentiometer 74a to be positioned to provide a voltage corresponding to the desired latitude. The wiper of potentiometer 74a is connected to one lead of the primary of transformer 73a through deck 16a in switching circuit 70. The other primary lead of transformer 73a is connected to the wiper of the desired potentiometer 69a through deck 17a of switch 17 by turning switch 17 to the desired mission point. Switch 30 is turned to the insert position which connects the transformer 73a secondary to motor 72a and also activates the clutch excitation voltage and disengages clutch 75a. Motor 72a responds to a voltage difference between the wiper voltage on potentiometer 74a and the wiper voltage on potentiometer 69a and drives the wiper of potentiometer 69a through clutch 71a until the voltages are equal and the point coordinate is stored in the appropriate potentiometer 69a.

An inserted coordinate may be recalled and indicated on indicator 28a by turning switch 17 to the desired mission point thereby connecting the wiper of the corresponding potentiometer 69a to transformer 73a primary through deck 17a of switch 17. Switch 30 is turned to the recall position which connects the secondary of transformer 73a to motor 72a. Motor 72a is responsive to a voltage difference between potentiometer 74a and 69a and drives the wiper of potentiometer 74a and counter 28a until the voltages are equal and the counter indicates the latitude of the inserted coordinate.

Figure 22:
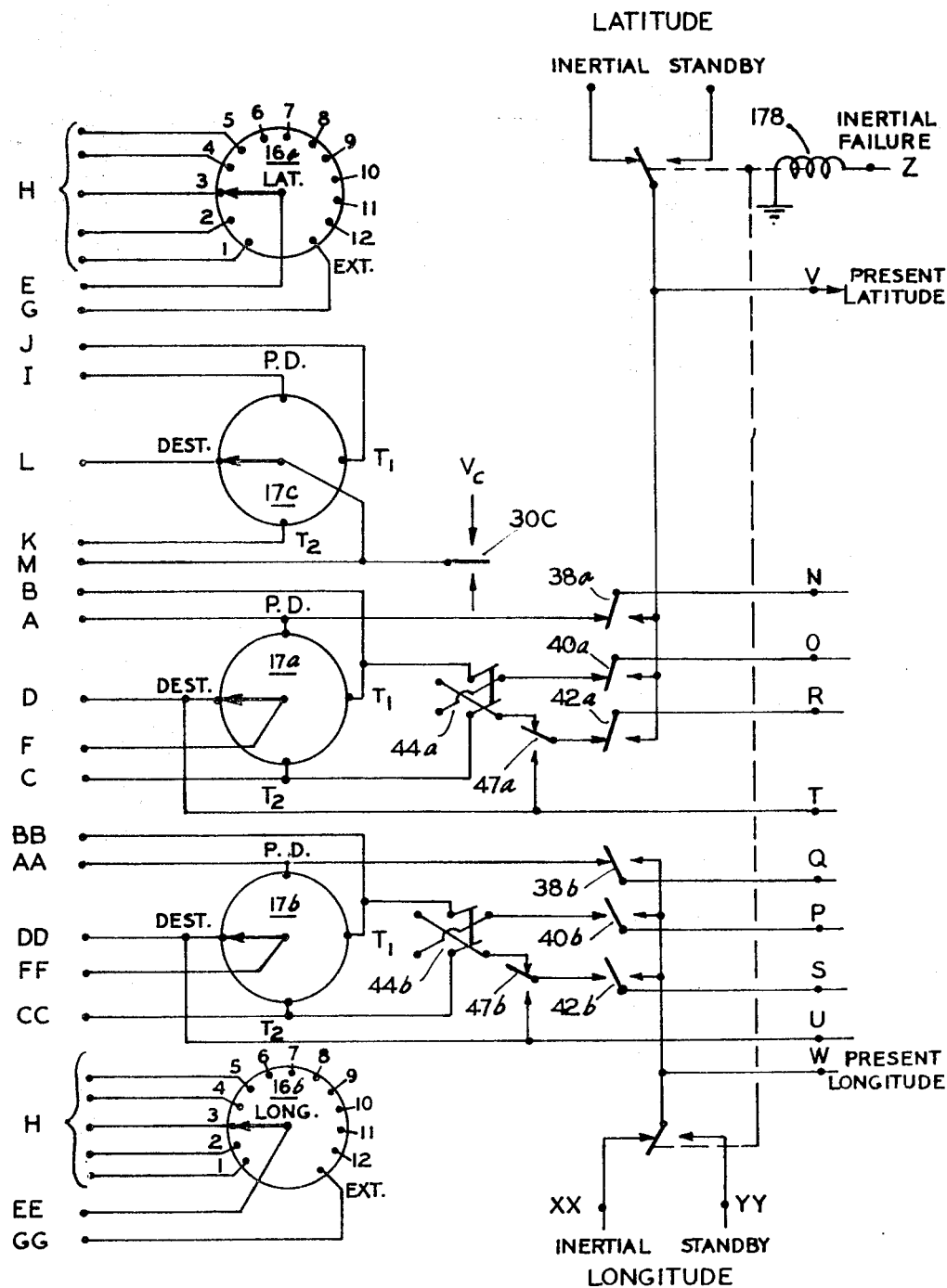
FIG. 22 is a schematic diagram of a switching circuit used in the navigational subsystem shown in FIG. 11A.

Servo means 76 are connected to potentiometers 69a and 69b through switches 38, 40 and 42 as shown in FIG. 22 and are responsive to the signals therefrom for providing mechanical displacements corresponding to the latitude and longitude of each of the mission points shown in FIG. 2. A differential 77 subtracts the displacement Lo 1 from the Lo 2 displacement to provide a displacement Δ Lo 1, 2 corresponding to the longitude difference between the point of displacement and target $T_1$. A differential 78 subtracts point Lo 2 from point Lo 3 to provide a displacement Δ Lo 2, 3 corresponding to the difference between points Lo 3 and Lo 2. A differential 79 subtracts point Lo 3 from Lo 4 to provide a displacement Δ Lo 3, 4 corresponding to the difference between points Lo 4 and Lo 3.

Figure 11A:
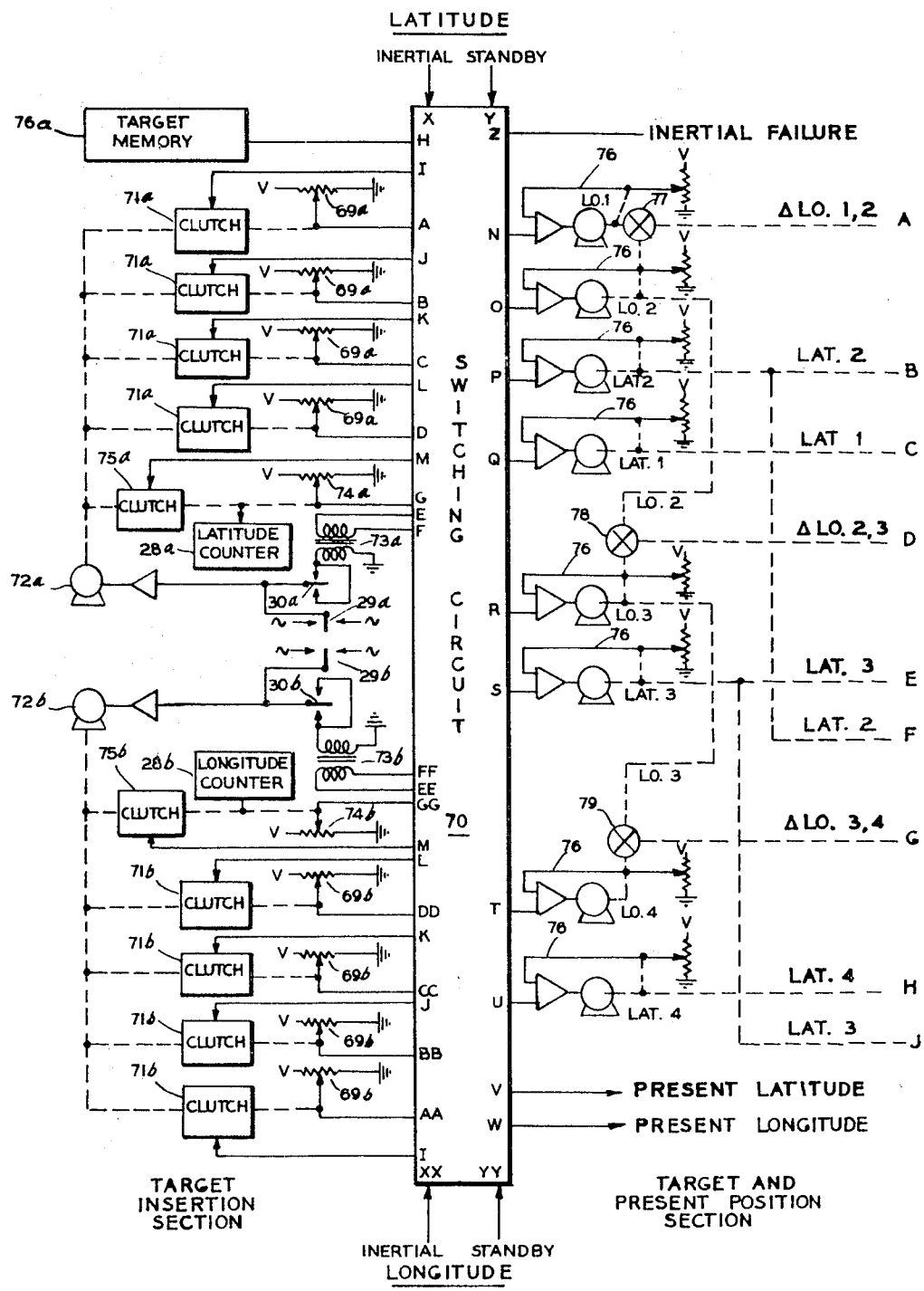
FIGS. 11A, 11B, 11C and 11D show a navigation subsystem constructed in accordance with the present invention.
Figure 11B:
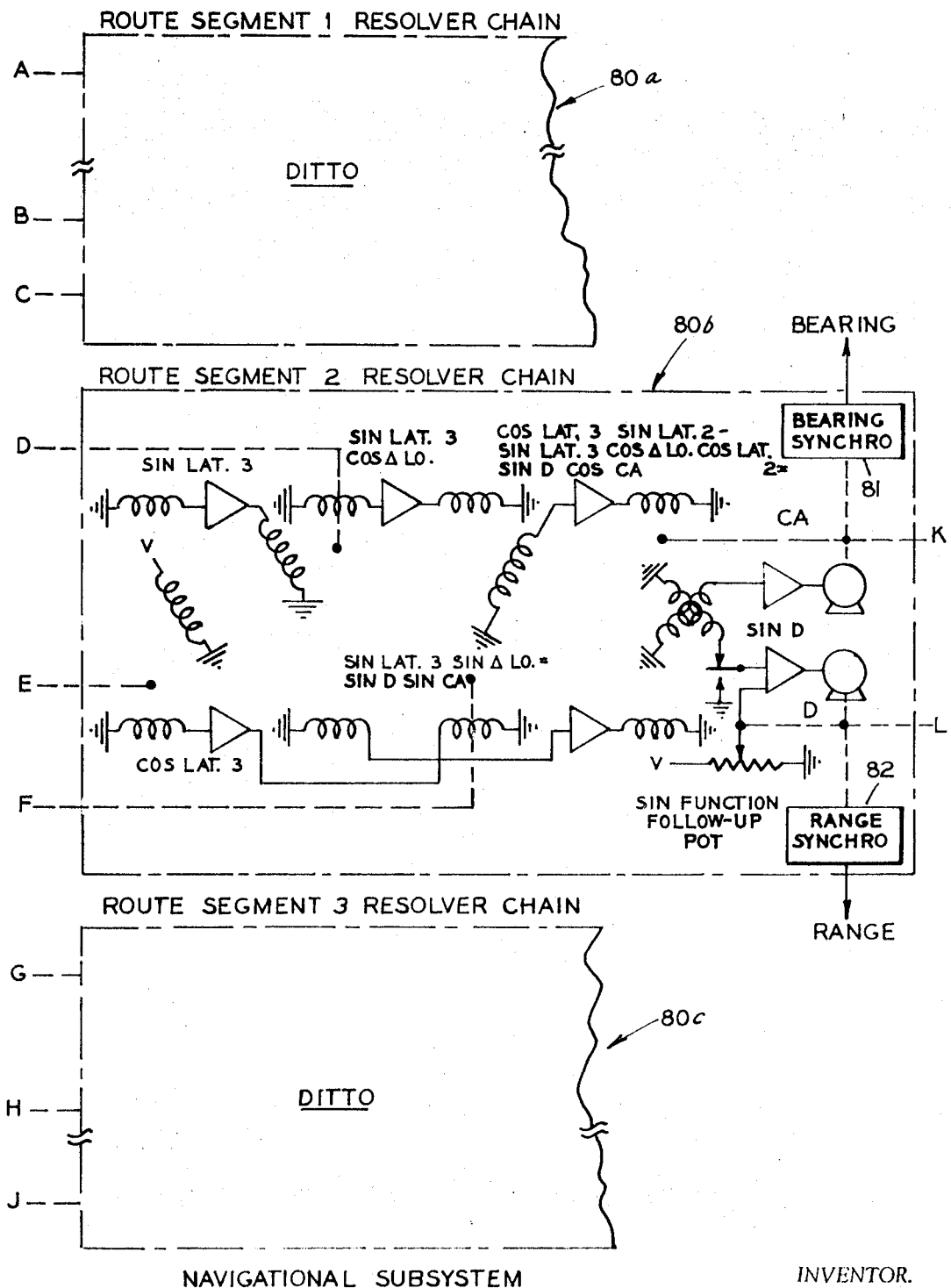

A resolver chain 80a in FIG. 11B is connected to the Lat 1, Lat 2, Δ Lo 1, 2 displacement signals. A resolver chain 80b is connected to the Lat 2, Lat 3, Δ Lo 2, 3 displacement signals. A resolver chain 80c is connected to the Lat 3, Lat 4, Δ Lo 3, 4 displacement signals. The resolver chains are identical to the chain shown in FIG. 4 and operate to provide displacement signals corresponding to bearing and ground range of the corresponding mission segment. Synchros 81 and 82 are connected to and responsive to displacement signals to provide corresponding electrical signals.

When switch 37 on control panel 12 in FIG. 7 is depressed, the system is in the plan mode and computes the bearing to target $T_1$ which is indicated on heading command indicator shown in FIG. 10 and the range to each mission point is displayed on the Present Position Indicator 13 shown in FIG. 8. Switch 37 is an override switch and disengages switches 38, 40 and 42 if they are engaged. When target $T_1$ is engaged by depressing switch 38, switch 38a and 38b in switching circuit 70 disconnects the Lo 1 and Lat 1 signals from servo means 76 and connects inertial present position longitude and latitude signals from an inertial navigation system. As the mission progresses the resolver chain 80a changes the range signal to correspond to the ground distance remaining in the segment and corrects the segment bearing for any flight deviations.

After completion of route segment one, or whenever target $T_2$ is engaged by depressing switch 40 causing switches 40a and 40b in the switching circuit 70 to disconnect the Lo 2 and Lat 2 signals from servo means 76 and connects the present position signals in their stead. The bearing signal from resolver chain 80b is connected to heading command indicator 15 and the indicator displays the bearing for the second route segment. The range to target $T_1$ shown on present position indicator 13 becomes zero when target $T_2$ is engaged and indicator 13 then indicates the range for the second and third route segments.

Route segment three is engaged by depressing switch 42 causing resolver chain 80c to operate in a manner similar to resolver chains 80a and 80b.

Figure 11C:
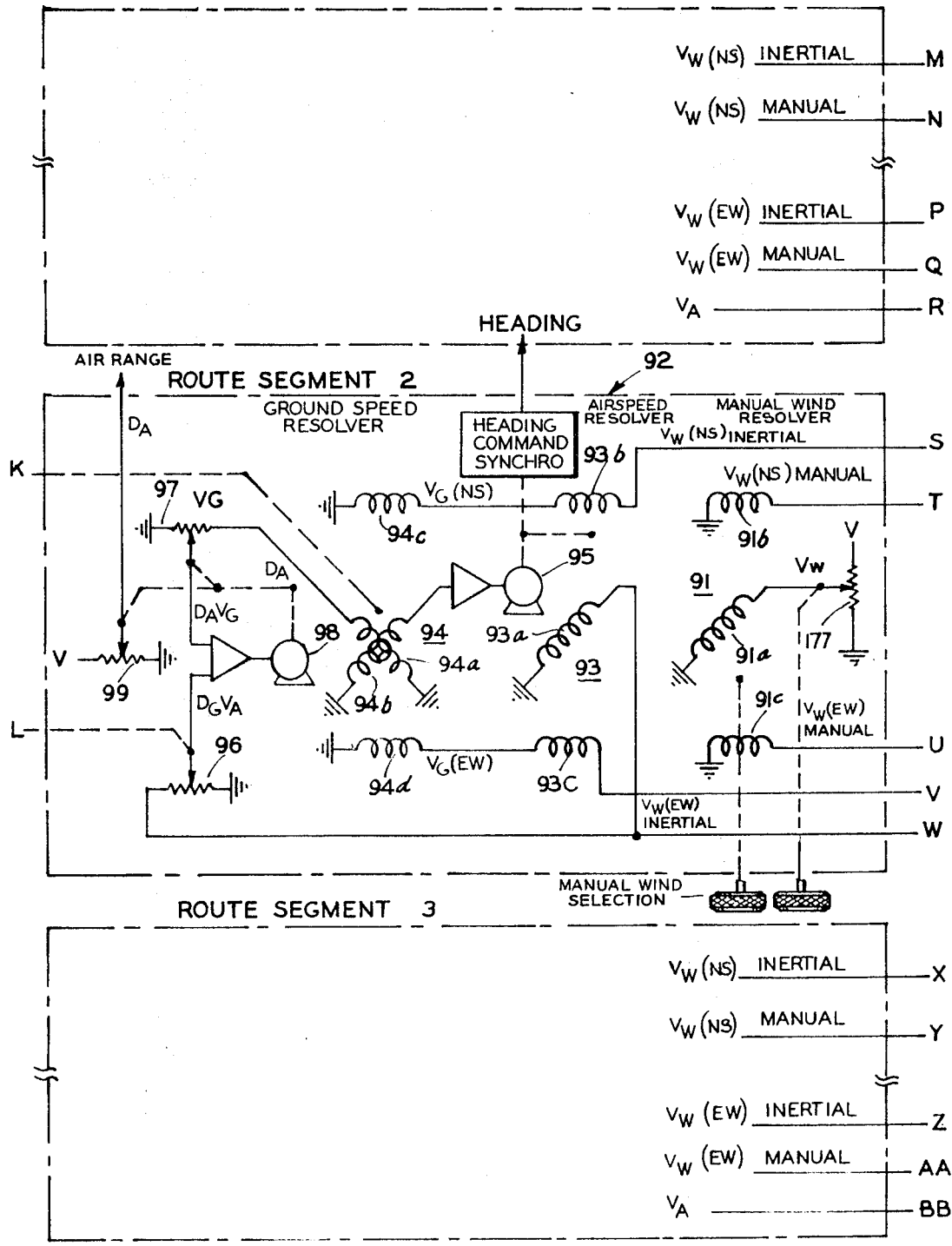
Figure 11D:
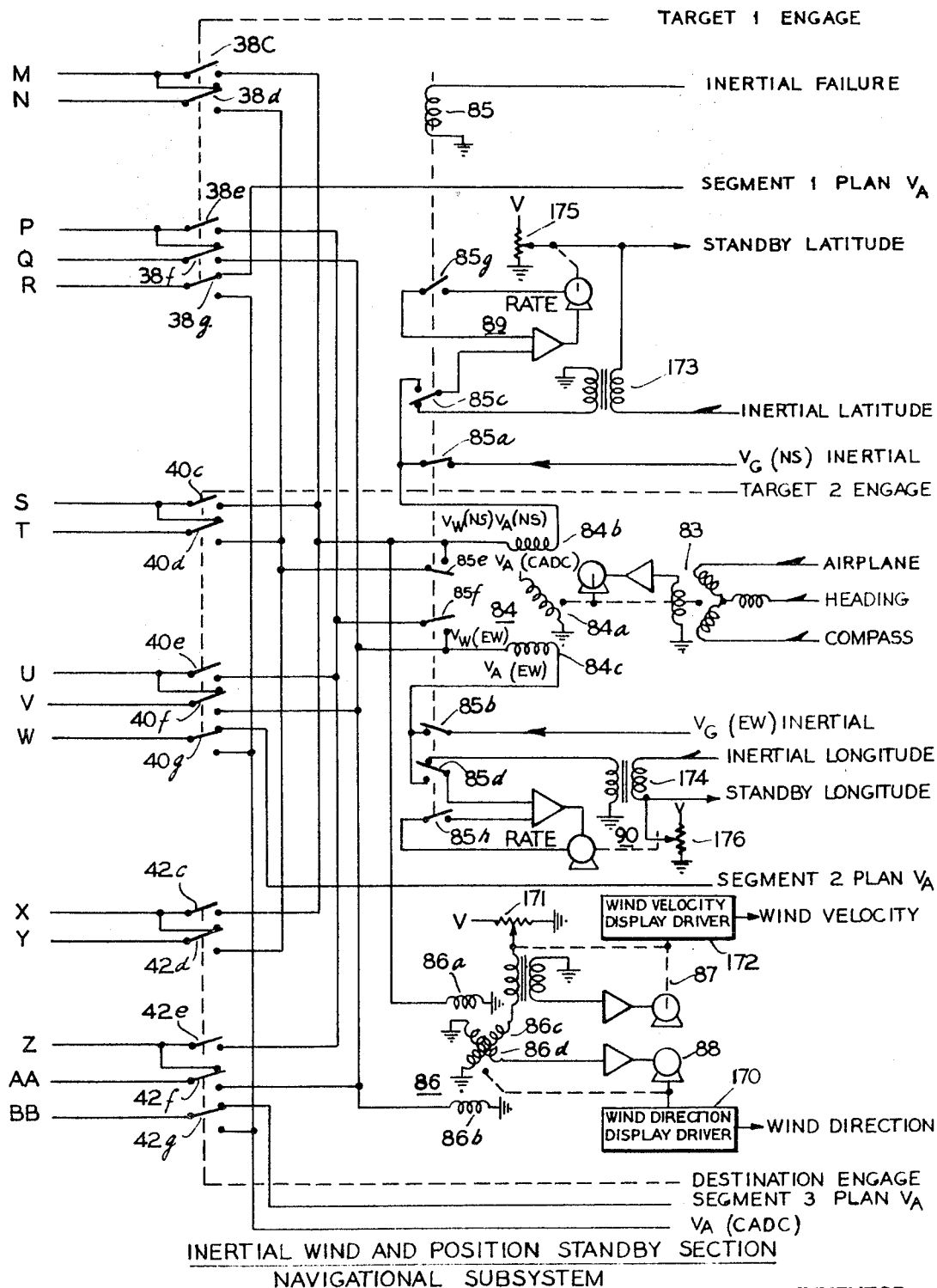

A servo means 83 in FIG. 11D is responsive to signals corresponding to airplane heading from a compass input for positioning a rotor 84a of a resolver 84 to a position corresponding to the airplane heading. The rotor is excited by a signal corresponding to the true airspeed from a central air data computer. Resolver 84 has a pair of stators 84b and 84c having induced voltages corresponding to the north-south and east-west components of the airspeed, respectively.

Contacts 85a of a relay 85 connects a signal corresponding to the north-south component of ground speed $V_G(NS)$ from the inertial navigation system to stator 84b of resolver 84. Stator 84b subtracts the ground speed signal from the airspeed signal and provides a signal corresponding to the north-south component of the wind velocity $V_W(NS)$. In like manner an inertial signal corresponding to the east-west component of ground speed $V_G(EW)$ is connected to stator 84c through contacts 85b and stator 84c provides a signal corresponding to the east-west component of the wind velocity $V_W(EW)$.

Stators 84b and 84c are connected to a pair of stators 86a and 86b, respectively, of a wind display resolver 86 having a first rotor 86c with an induced voltage corresponding to wind velocity. A second rotor 86d at right angles to the wind velocity rotor has a zero induced voltage when positioned to correspond to the wind direction. A servo means 88 is responsive to voltage induced in rotor 86d to position the rotor to correspond to the wind direction. A synchro 170 is positioned by servo means 88 to provide a signal corresponding to wind direction. A servo means 87 is responsive to the wind velocity voltage in rotor 86c to position a follow up potentiometer 171 to a position corresponding to velocity. A synchro 172 is positioned by the servo means 87 to provide a signal corresponding to wind velocity. The synchros 170 and 172 are connected to heading command indicator 15 and the signals therefrom are used to drive digital readouts 67 and 68.

Inertial latitude and longitude signals are provided to two servo means 89 and 90, respectively, through transformers 173 and 174 and contacts 85c and 85d of relay 85. Servo means 89 and 90 drive potentiometers 175 and 176 to positions corresponding to the present latitude and longitude, respectively. Potentiometers 175 and 176 provide standby signals corresponding to the present latitude and longitude and are connected to terminals Y and YY of circuit 70 for use in the event of a failure of the inertial navigational system.

Referring to FIG. 11C, computer 92 is provided for each route segment. Each computer has a manual wind resolver 91 having a rotor 91a that is manually positioned by knob 26, shown in FIG. 6, to a position corresponding to the estimated wind direction. The rotor is excited by a potentiometer 177 having a wiper positioned by knob 27, shown in FIG. 6, and providing a signal corresponding to the estimated wind velocity. Resolver 91 has stators 91b and 91c having induced voltages corresponding to estimated north-south and east-west wind components.

Referring to FIG. 11A, switching circuit 70 has a relay responsive to a failure signal from the inertial navigation system to disconnect the inertial latitude and longitude signals from switches 38, 40 and 42 and to connect the standby latitude and longitude signals. Relay 85 in FIG. 11D is also responsive to the inertial failure signal to disconnect the inertial ground speed signals $V_G(NS)$ and $V_G(EW)$ from the stators of resolver 84 by opening contacts 85a potentiometers and 85b. During inertial failure, the estimated wind component signals from stators 91b and 91c for the engaged segment are connected to stators 84b and 84c through contacts 85e and 85f of relay 85 and the engage switch of the corresponding segment. During inertial failure stators 84b and 84c add the airspeed components to the estimated wind components to provide signals corresponding to estimated ground speed components. Relay 85 also in response to the inertial failure signal disconnects the inertial latitude and longitude signal from servo means 89 and 90 by opening contacts 85c and 85d. Contacts 85c and 85d connect the estimated ground speed signals to servo means 89 and 90. Servo means 89 and 90 have rate signals connected to the servo inputs by contacts 85g and 85h of relay 85. The servo means 89 and 90 become integrators integrating the estimated ground speed signals causing the wipers of potentiometers 175 and 176 to be repositioned to correspond to the present position of the aircraft.

Planned airspeed signals from the fuel management subsystem for each segment are supplied to the corresponding computer 92 through decks 38g, 40g and 42g of the switches 38, 40 and 42. When a segment is engaged, the true airspeed signal $V_A(CADC)$ is substituted for the planned airspeed signal in the engaged segment by deck g of the appropriate engage switch.

An airspeed resolver 93 has a rotor 93a excited by the airspeed signal either true or planned and positioned to correspond to a heading command by a motor 95. Resolver 93 has two stators 93b and 93c for receiving the wind component signals. When a segment is engaged, stators 93b and 93c are connected to stators 84b and 84c of resolver 84 for receiving the wind component signals. The stators 93b and 93c of resolver 93 in the segments that are not engaged are connected to the stators 91b and 91c of resolver 91 for receiving the estimated wind components for the segment. The stators of resolver 93 have voltages induced therein corresponding to the north-south and east-west components of the airspeed. The airspeed components are added to the wind components to provide signals corresponding to the ground speed components.

A ground speed resolver 94 has stators 94c and 94d connected to stators 93b and 93c of resolver 93 and excited by the signals therefrom. Resolver 94 has two rotors 94a and 94b placed at right angles and connected to the bearing displacement signal from the resolver chain of the corresponding route segment and positioned to correspond to target bearing. When the heading command is proper, the ground speed components exciting the stators of resolver 94 will induce a voltage corresponding to ground speed in rotor 94a and zero voltage in rotor 94b. If the position of resolver 93 does not correspond to the required heading an error voltage will appear on rotor 94b of resolver 94. Motor 95 is connected to rotor 94b and is responsive to the signal therefrom to position the rotor of resolver 93 to the heading command position needed to achieve the desired bearing.

Figure 1:
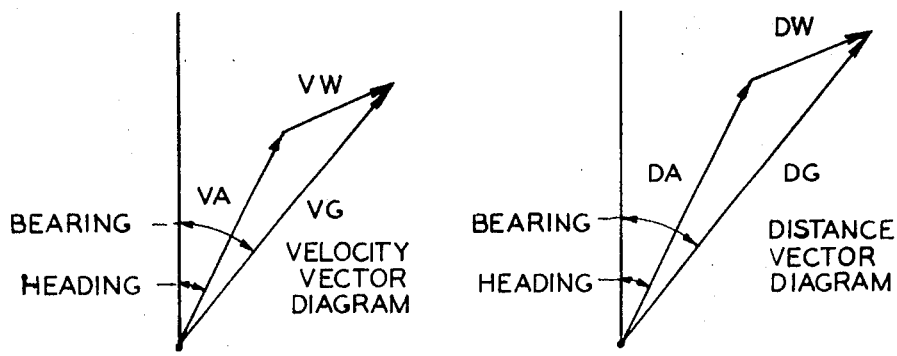
FIG. 1 shows two vector diagrams, one a velocity vector diagram and the other a distance vector diagram.

A potentiometer 96 is excited by the airspeed signal and a potentiometer 97 is excited by the ground speed signal from rotor 94a of resolver 94. Potentiometer 96 has a wiper connected to the displacement output corresponding to segment ground distance from the resolver chain for the engaged segment. The wiper of potentiometer 96 provides a voltage corresponding to $D_G V_A$. Potentiometer 97 has a wiper connected to a motor 98 and positioned thereby. The wiper of potentiometer 97 provides a voltage corresponding to $D_A V_G$. Comparing the two similar triangles in FIG. 1, it can be shown that $D_A V_G$ equals $D_G V_A$. Motor 98 is connected to the wipers of potentiometers 96 and 97 and is responsive to the difference between the signals therefrom to position the wiper of potentiometer 97 and adjust the voltage therefrom equal to the $D_G V_A$ voltage thereby positioning the wiper at a position corresponding to $D_A$. Motor 98 also positions the wiper of a potentiometer 99 so that the wiper provides a signal corresponding to the air range of the segment.

Aircraft fuel management requires that an aircraft be flown at the most advantageous altitude and mach to achieve maximum efficiency. There are two possible figures of merit for aircraft efficiency, one to obtain maximum range and the other maximum endurance. The present invention provides switch 36 in FIG. 7 for selecting either the maximum range designated as cruise mode or maximum endurance designated as loiter mode. The invention computes and displays an altitude and mach command which must be followed to obtain the maximum efficiency for the mode selected. Based on the computed altitude and mach number the computer predicts reserve fuel and flight time; however, this is only a true prediction if the pilot maintains the command altitude and mach number. Despite the fact that a pilot has violated the commands, the computer nevertheless continually updates and corrects the fuel reserve and time remaining indications.

If the mission requires a specific altitude other than the optimum or a faster speed the pilot inserts the required altitude for each segment using knob 19 in FIG. 6. A higher speed can only be attained at a loss or range; however, in the area of maximum efficiency a one percent range loss results in a five percent speed increase. The pilot can choose a specified high speed range trade-off using knob 19 in FIG. 6. The computer then displays the optimum altitude and the optimum mach number biased for the high speed range trade-off. The computer predicts reserve fuel and flight time based on the planned altitude and range trade off and continuously corrects the prediction for pilot deviations based on the assumption the pilot will immediately return to the proper altitude and mach number.

Maximum range conditions may be determined by considering the following:

$$\text{Range} = V \int dt \tag{10}$$

$V$ = Velocity $$-\frac{dw}{dt} = C_j T$$

$w$ = weight $C_j$ = specific fuel consumption $T$ = thrust $$\text{Range} = -\int_{W_{ZF}}^{W_G} \frac{V dW}{C_j}$$

$W_G$ = gross weight $W_{ZF}$ = zero fuel gross weight $$\text{Lift} = W = \frac{1}{2} \rho V^2 C_L S \tag{11}$$

$\rho$ = air density $C_L$ = lift coefficient $S$ = wing area $$V = \frac{\sqrt{2} \; W^{1/2}}{\rho^{1/2} C_L^{1/2} S^{1/2}} \tag{12}$$

$$\text{Range} = -\int_{W_{ZF}}^{W_G} \frac{\sqrt{2} \; W^{1/2} dW}{C_j T \rho^{1/2} C_L^{1/2} S^{1/2}}$$

$L = W$ (lift equals weight)

$$\frac{L}{W} = 1$$

$T = D$ (thrust equals drag)

$$\frac{L}{D} = \frac{C_L}{C_D}$$

$C_D$ = coefficient of drag $$\text{Range} = -\frac{\sqrt{2} \; C_L^{1/2}}{C_j C_D S^{1/2} \rho^{1/2}} \int_{W_{ZF}}^{W_G} W^{-1/2} dW \tag{13}$$

Thus maximum range can be achieved when the ratio $C_L^{1/2}/C_D$ is a maximum. $C_L^{1/2}/C_D$ is proportional to the angle of attack however angle of attack can not be accurately measured. Using aerodynamic arithmetic a more convenient parameter may be used.

$$W = \frac{1}{2} \rho V^2 C_L S$$

$$\frac{\rho}{\rho_o} = \frac{PT_o}{P_o T} \quad \delta = \frac{P}{P_o} \quad V = a_o M \sqrt{\frac{T}{T_o}}$$

$\rho_o$ = standard density $P$ = air pressure $P_o$ = standard sea level pressure $T$ = temperature $T_o$ = standard sea level temperature $a_o$ = speed of sound at standard temperature $$\frac{W}{\delta} = \frac{\frac{1}{2} \rho a_o 2 \frac{T}{T_o} C_L S M^2}{\frac{\rho}{\rho_o} \frac{T}{T_o}}$$

$$\frac{W}{\delta} = \frac{1}{2} \rho_o a_o^2 C_L S M^2 \tag{14}$$

By picking the value of $C_L$ which exists when $C_L^{1/2}/C_D$ is a maximum all the constants may be lumped into one constant and the following equation results.

$$M_{maximum\;range} = K_{cruise} \sqrt{\frac{W}{\delta}} \tag{15}$$

The computer can then use the weight and pressure ratio information to compute mach for maximum range.

Equation 15 shows that for optimum efficiency the mach should remain constant and to do this altitude must increase as weight decreases. Thus the optimum altitude is a function of the weight.

Maximum endurance conditions may be determined by considering:

$$\text{Endurance} = \int dt \tag{16}$$

$$\frac{dW}{dt} = -C_j T$$

$$\text{Endurance} = -\int_{W_{ZF}}^{W_G} \frac{dW}{C_j T}$$

$D = T \quad L = W$ $$\text{Endurance} = -\int_{W_{ZF}}^{W_G} \frac{dW}{C_j D} \frac{L}{W} = \frac{C_L}{C_D} \frac{1}{C_j} \int_{W_{ZF}}^{W_G} \frac{dW}{W}$$

$$\text{Endurance} = \frac{C_L 1}{C_D C_j} \log_e \frac{W_G}{W_{3F}} \quad (17)$$

By substituting the value of $C_L$ existing when $C_L/C$ is a maximum into equation 14 and lumping the constants the following equation results.

$$M_{maximum\ endurance} = K_{loiter} \sqrt{\frac{W}{\delta}} \quad (18)$$

Using this equation the computer can compute the mach number for maximum endurance using weight and pressure ratio information.

Figure 12:
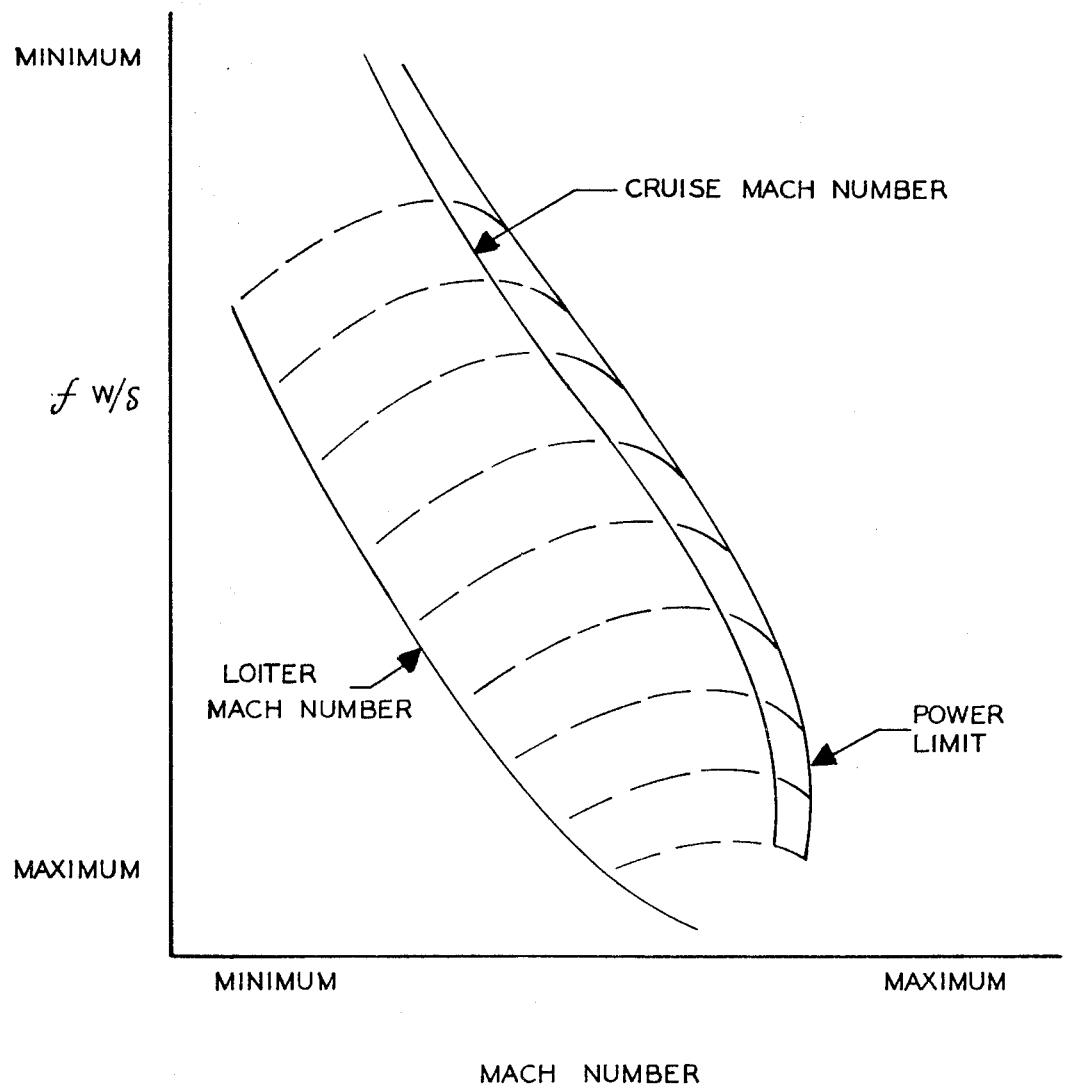
FIG. 12 is a graph showing mach number as a function of aircraft weight and density ratio.

Referring to FIG. 12 there is shown the general form of the equations for maximum endurance and for maximum range. The dotted lines show range peaking trends over the mach range.

Figure 15:
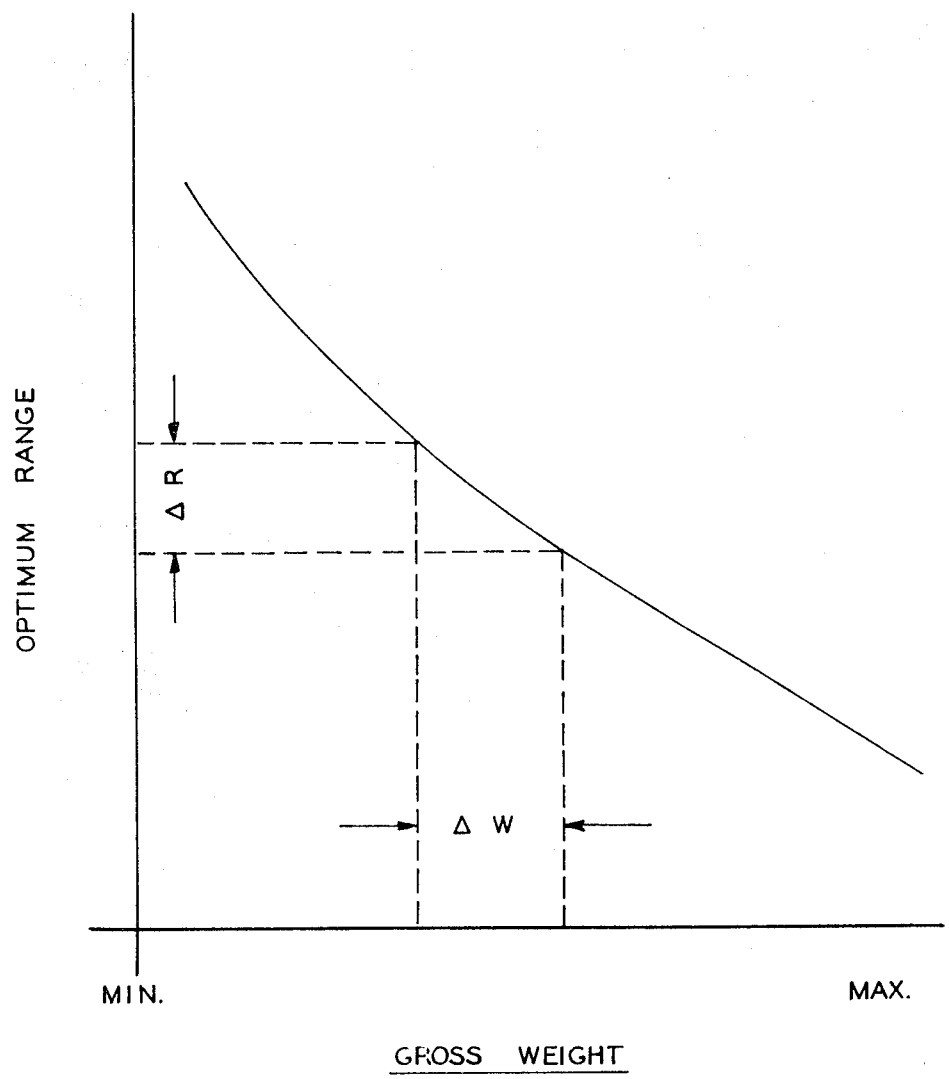
FIG. 15 is a graph of an optimum range potential at various gross weights if altitude is not restricted.

Specific range data at various altitudes is available for all aircraft. If the specific range at a specified altitude is integrated between two levels of gross weight the potential range may be predicted if the pilot flies at that altitude and the optimum mach number for maximum range. FIG. 13 shows a specific range curve for 25,000 feet at various gross weights, the range potential is shown as the area under the curve for a $\Delta W$ change in gross weight. The range potential may be plotted against gross weight as shown in FIG. 14 for various altitudes. A change in gross weight $\Delta W$ will produce a range potential of $\Delta R$. For optimum range equation 15 indicates that as weight is reduced the altitude should be increased. Thus constant mach number and increasing altitude produces the optimum range potential which may be plotted as shown in FIG. 15.

Figure 16:
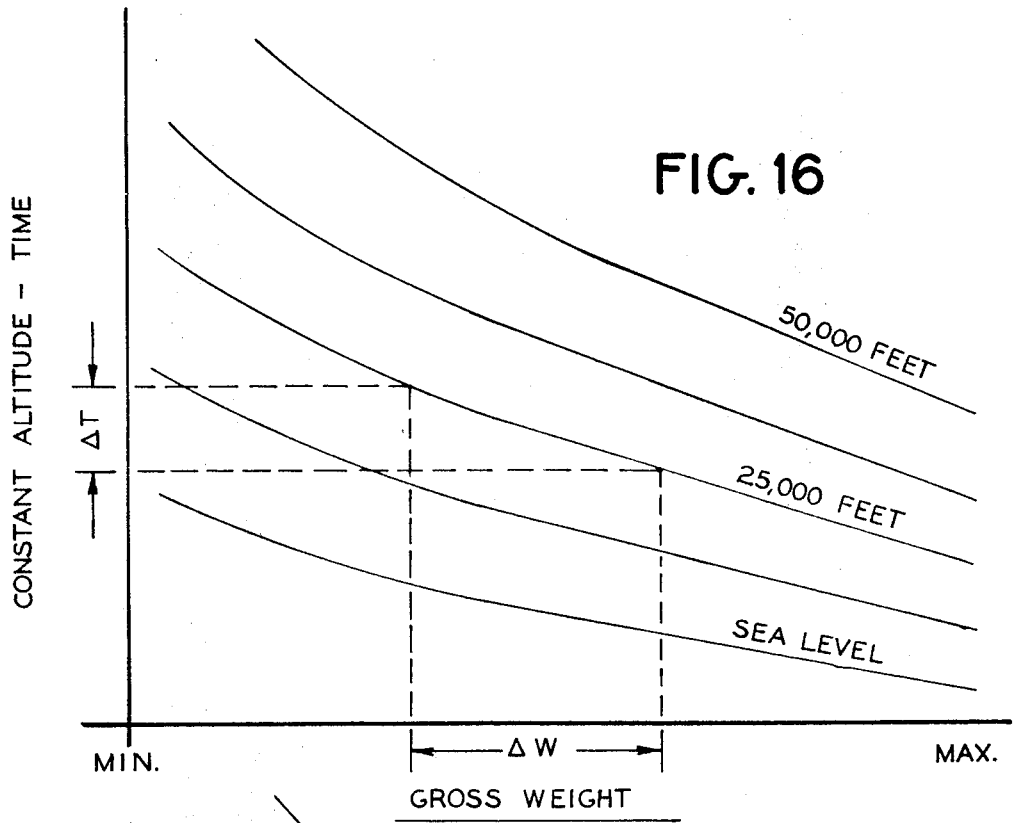
FIG. 16 shows a collection of curves having time remaining plotted against gross weight change at various altitudes.
Figure 17:
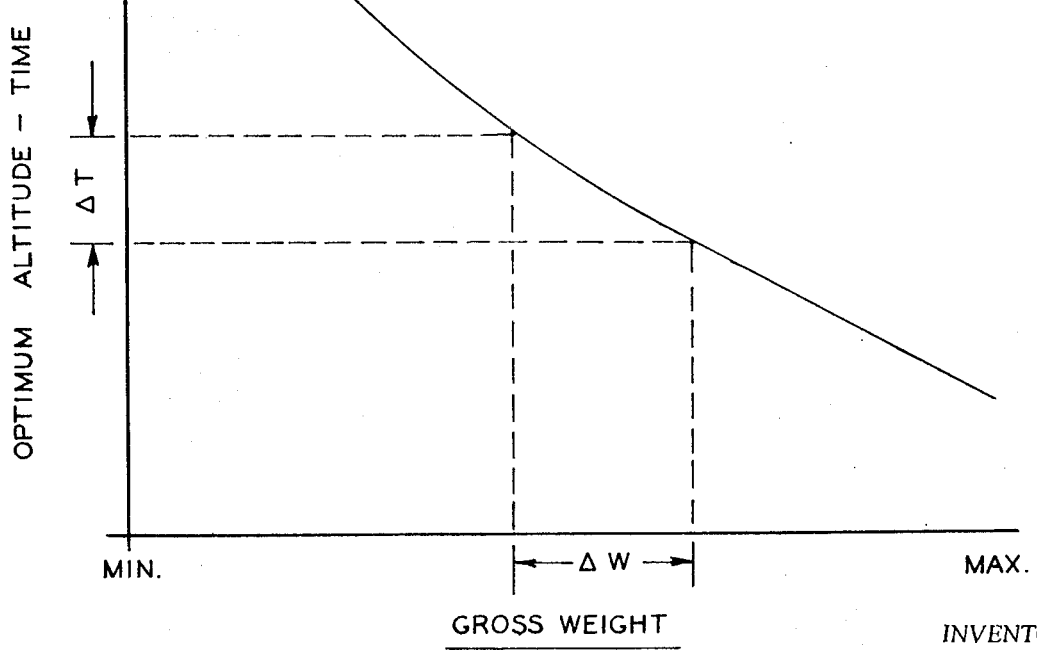
FIG. 17 shows a curve for optimum time remaining if altitude is not restricted.

In a similar manner data can be plotted for time remaining at various altitudes for changes in gross weight, FIG. 16 shows a graph having this information. If the aircraft may climb and maintain the optimum altitude and mach number a single line curve may be used to plot the optimum time remaining as shown in FIG. 17.

Figure 18:
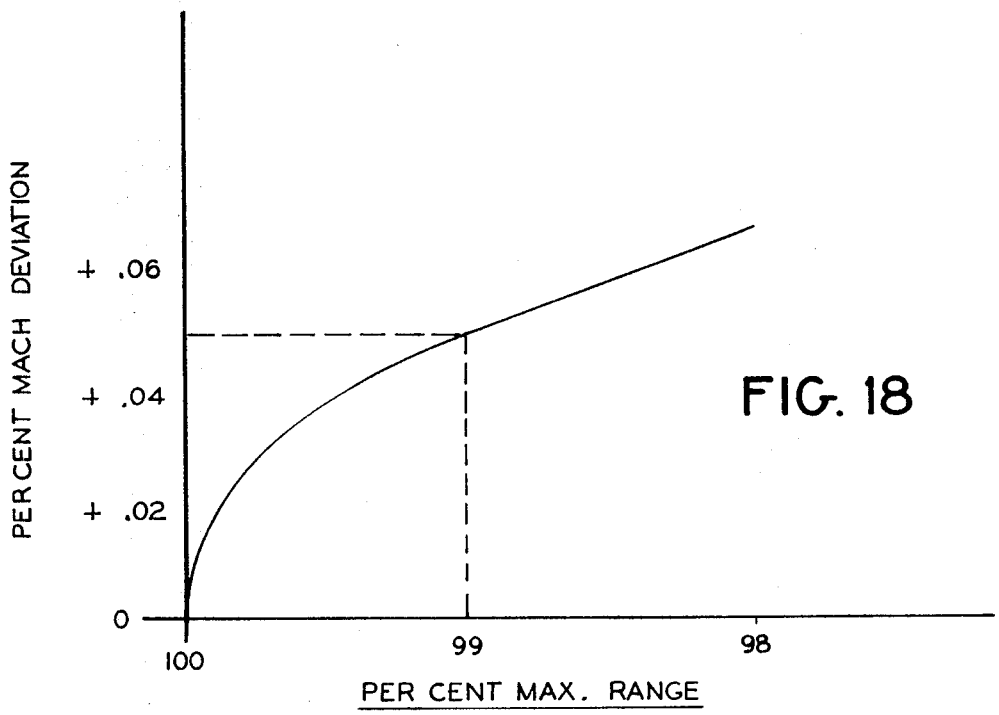
FIG. 18 is a graph showing percent of range loss for percent of mach number deviation.

The computation of range must take into effect the range trade off and lost efficiency when the pilot elects to fly at a mach other than optimum. FIG. 18 shows a percentage range loss for percentage deviation from optimum mach number.

The fuel management subsystem is shown in FIG. 19 and comprises a segment computer for each mission segment and other computing and control circuitry. Prior to the start of the mission all three compute fuel management data based on planned mission parameters inserted into the mission definition panel 10. When target $T_1$ is engaged the segment computer 100a computes fuel management data based on the actual aircraft performance and predicts reserve fuel and flight time on the basis the pilot will complete the segment at the planned mission parameters. Computers 100b and 100c compute data based on the planned parameters. Thus the system accounts for deviations in past performance and predicts on the basis of an immediate return to the planned optimum flight parameters.

Figure 20:
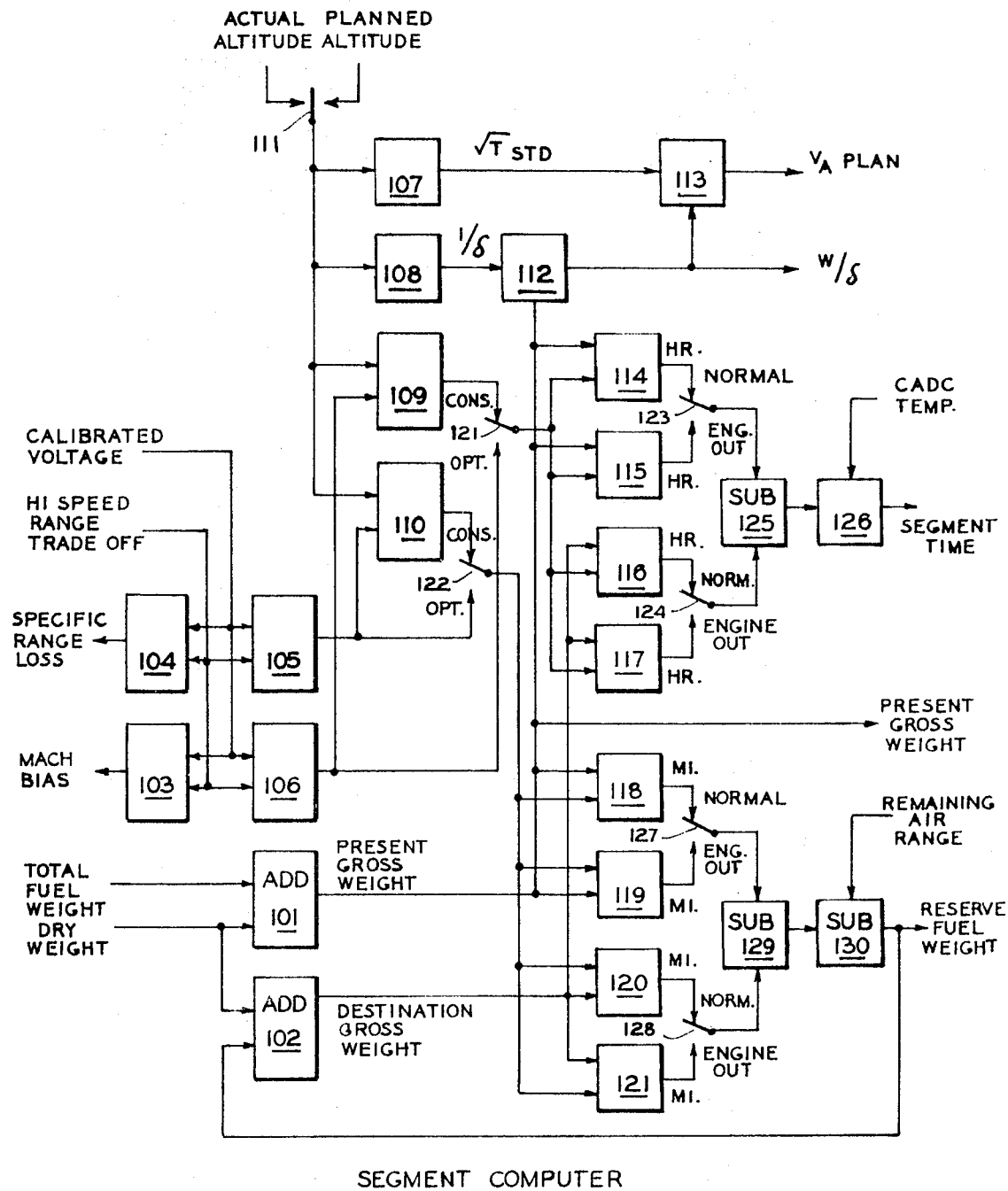
FIG. 20 is a block diagram of a segment computer.

Referring to Fig. 20, there is shown a block diagram of a typical segment computer. An ADD circuit 101 adds a signal corresponding to present fuel weight to a signal corresponding to aircraft dry weight and has an output providing a signal corresponding to present gross weight. An ADD circuit 102 adds the signal corresponding to aircraft dry weight to a signal corresponding to reserve fuel weight and has an output providing a signal corresponding to destination gross weight. The computation of reserve fuel weight will be discussed subsequently. Two memory devices 103 and 104 receive a signal corresponding to high speed range trade off and a calibrated excitation voltage. Devices 103 and 104 have information stored therein corresponding to the curve shown in FIG. 18. Device 103 has an output providing a signal corresponding to the increase in mach number that may be obtained for the selected high speed range trade off. Memory device 104 has an output providing a signal corresponding to the specific range loss caused by the high speed range trade off. Two attenuation devices 105 and 106 receive the high speed range trade off signal and the calibrated excitation voltage. Attenuation device 105 has an output providing excitation for an attenuation device 110 and attenuation device 106 provides excitation for an attenuation device 109. Attenuation devices 105 and 106 are responsive to the high speed range trade off signals to attenuate the excitation voltages in accordance with the loss in specific range and specific endurance, respectively caused by the high speed range trade off. Attenuation devices 109 and 110 receive either actual or planned altitude signals through a switch 111. Switch 111 is responsive to a target engage command from the control panel for switching from the planned altitude signal to an actual altitude signal. Attenuation devices 109 and 110 each have an output supplying an excitation that is attenuated in accordance with the effect of altitude on specific endurance and specific range, respectively. A switch 121 has a first and a second terminal connected to the output of attenuation device 109 and the output of attenuation device 106, respectively. Four memory devices 114, 115, 116 and 117 are connected to a common terminal of switch 121 and are excited by the signal therefrom. Switch 121 normally supplies the excitation from attenuation device 109 to the four memory devices and is responsive to an optimum altitude command from switch 19 in FIG. 6 to switch to the output of attenuation device 106. Thus, the excitation to memory devices 114, 115, 116 and 117 is attenuated when the aircraft is flying at other than optimum altitude. Memory devices 114 and 116 have information stored therein corresponding to potential flight time available at various gross weights as shown in FIG. 17. Memory devices 115 and 117 have similar information stored therein for an aircraft configuration with one engine failed. Memory devices 114, 115 are connected to the output ADD circuit 101 and receive the signal corresponding to present gross weight. Memory devices 114 and 115 have outputs providing signals corresponding to flight time at the present gross weight. Memory devices 116 and 117 are connected to the output of ADD circuit 102 and receive the destination gross weight signal therefrom. Devices 116 and 117 have outputs supplying signals corresponding to flight time at the destination gross weight. A subtract circuit 125 is connected to memory device 114 through a switch 123 and is connected to memory device 116 through a switch 124. Subtract circuit 125 has an output providing a signal corresponding to the difference between the flight times at the present and destination gross weight. Switches 123 and 124 are responsive to engine out commands from the Mission Definition Panel to switch to memory devices 115 and 117 and subtraction circuit 125 receives signals corresponding to an aircraft engine out configuration.

When switch 121 is switched to the output of attenuation device 109, the excitation to memory devices 114, 115, 116 and 117 is attenuated in accordance with the altitude signal supplied to attenuation device 109. The variable excitation to the memory devices causes the slope of the curve stored therein to vary in accordance with the altitude as shown in FIG. 16.

A variable gain device 126 is connected to the output of subtraction circuit 125 and receives the time signal therefrom. The device is responsive to a temperature signal from the central air data computer to vary the level of the time signal to correct for temperature deviations from a standard day. Device 126 has an output providing a signal corresponding to the time to destination.

Four memory devices 118, 119, 120 and 121 are connected to a common terminal of a switch 122 which has a first and second terminal connected to attenuation device 110 and 105, respectively. The common terminal of switch 122 is normally connected to the first terminal but is responsive to an optimum altitude command from switch 19 in FIG. 6 to switch to the second terminal. Thus memory devices 118, 119, 120 and 121 are excited by either a constant excitation from attenuator 105 or a variable excitation from attenuator 110. Memory devices 118 and 120 have information stored therein corresponding to the curve in FIG. 15 for a normal airplane configuration. Memory devices 118 and 119 are connected to ADD circuit 101 and receive the present gross weight signal and have outputs providing signals corresponding to range at the present gross weight. Memory devices 120 and 121 are connected to ADD circuit 102 and receive the destination gross weight signal and have outputs providing signals corresponding to range at the destination gross weight. A subtract circuit 129 is connected through a switch 127 to the output of memory device 118 and is also connected through a switch 128 to the output of memory device 120. Subtract circuit 129 subtracts the two range signals and has an output providing a signal corresponding to potential range. Switches 127 and 128 are responsive to an engine out command from the Mission Definition Panel to switch to memories 119 and 121 allowing subtract circuit 129 to provide a signal corresponding to the potential range for an engine out configuration.

The variable excitation from excitation device 110 causes the slope of the information stored in the memory devices to change in corresponding relation to the altitude as shown in FIG. 14. A subtract circuit 130 is connected to subtract circuit 129 and receives the potential range signal therefrom and also receives the signal corresponding to remaining air range from the navigational subsystem. Subtract circuit 130 subtracts the remaining air range signal from the potential range signal and has an output providing a signal corresponding to reserve range which also corresponds to the reserve fuel weight. The output of subtract circuit 130 is connected to the input of ADD circuit 102.

Two memory devices 107 and 108 are connected to switch 111 and receive either the actual or planned altitude signals therefrom. Memory device 108 has an output that is responsive to the altitude signal to provide a signal corresponding to the inverse of the density ratio at the planned or actual altitude. A multiplying circuit 112 is connected to memory device 108 and ADD circuit 101 and has an output for providing a signal corresponding to the present gross weight divided by density ratio. The gross weight divided by density ratio signal may be used to compute mach numbers for maximum range and maximum endurance in accordance with equations 15 and 18 and the curves in FIG. 12.

Memory device 107 has information stored therein corresponding to the square root of standard temperature at various altitudes and is responsive to the altitude signal to provide a signal corresponding to the square root of the standard temperature at the planned or actual altitude. True airspeed for maximum efficiency is a function of gross weight divided by density ratio and temperature. Computing device 113 is connected to memory device 107 and multiplying circuit 112 and is responsive to the signals therefrom to compute and provide a signal corresponding to the true airspeed for the maximum efficiency.

Referring to FIG. 19 the fuel management subsystem receives signals corresponding to engine fuel flow and after burner fuel flow. A summing means 131 adds the fuel flow signals and provides a signal corresponding to total fuel flow. A deck 33a of switch 33 normally connects the total fuel flow signal to one lead of a primary winding of a transformer 132. The other lead of the primary winding of transformer 132 is connected to a rate output of a generator 133. Transformer 132 has a secondary winding having one lead grounded and another lead connected to a servoamplifier 134 through a normally closed terminal of switch 30. The secondary transformer 132 has an induced voltage corresponding to the difference between the fuel flow signal and the rate generator signal. Amplifier 134 has an output which is responsive to the difference signal and is connected to a motor 135. Motor 135 is connected to generator 133 and is responsive to output from amplifier 134 to drive the generator at a rate sufficient to produce a rate voltage equal to the total fuel flow signal voltage. Motor 135 is connected to a wiper of a potentiometer 136 and continuously positions the wiper to correspond to the change in fuel level.

Switch 33 is used to cause the wiper of potentiometer 136 to be driven to an initial position corresponding to the initial total fuel. Deck 33a has a normally open terminal that is connected to a common terminal of a deck 33b. Deck 33b has two terminals connected to voltages of opposite polarity. If it is desirable to increase or decrease the initial setting of the wiper of potentiometer 136, switch 33 will supply a proper polarity voltage to the primary winding of transformer 132 thereby causing motor 135 to drive in an increasing or decreasing direction. When the potentiometer wiper is in the proper position switch 33 is released and motor 135 stops at that position. Potentiometer 136 is excited by a unity voltage V and provides a signal corresponding to the total fuel to the indicator 14. A transformer 137 has a primary winding having a first lead connected to the wiper of potentiometer 136 and a second lead receiving a signal from a fuel weight sensor in the fuel tank corresponding to the total fuel. Any difference in the voltage on the wiper of potentiometer 136 and the sensed fuel weight signal is induced into a secondary winding of transformer 137 having a first lead grounded and a second lead connected to a level detector 138. Level detector 138 provides either a high or low warning signal if the sensed fuel weight signal is a specified level above or below the total fuel signal. The second lead of the secondary winding of transformer 137 is also connected to a normally open terminal of switch 32. If the tank gauge mode of total fuel computation is desired switch 32 is switched to the tank gauge position on the control panel causing amplifier 134 to be connected to the secondary of transformer 137 and responsive to the difference between the wiper voltage of potentiometer 136 and the tank gauge voltage. The amplifier output causes the motor to position the wiper so as to provide a voltage equal to the level of the fuel weight sensor signal.

Three summing devices 139, 140 and 141 receive signals corresponding to weapon weight, wing tank weight, and airframe weight for each of the three mission segments respectively. Each summing device has an output providing a signal corresponding to the total dry weight for the respective segment. The output of summing device 141 is connected to segment computer 100c and to a normally open terminal of switch 42. The output of summing device 140 is connected to segment computer 100b and a normally closed terminal of switch 42. The output of summing device 139 is connected to a normally closed terminal of a switch 40. Switch 40 has a normally open terminal connected to a common terminal switch 42. Segment computer 100a is connected to a common terminal of switch 40 and receives the total dry weight signal from summing device 139. Switch 40 when activated connects segment computer 100a to the output of summing device 140 and thus supplies segment computer 100a with a signal corresponding to the dry weight for segment two. Switch 42 engages the destination and connects the segment three dry weight signal from summing device 141 to segment computer 100a. A calibrated voltage signal from knob 53 in FIG. 7 is supplied to each segment computer. Each segment computer receives signals corresponding to high speed range trade off, actual altitude, planned altitude, segment air range and CADC temperature. Segment computer 100a receives a signal corresponding to total fuel from the wiper of potentiometer 136. Each segment computer computes and provides signals corresponding to specific range loss, mach bias, planned airspeed, reserved fuel at the segment destination and time to the segment destination. Segment computer 100a provides a signal corresponding to the fuel weight at $T_1$ to segment computer 100b which computes and provides a signal corresponding to the fuel weight at $T_2$. Segment computer 100c receives the signal corresponding to fuel weight at $T_2$ and provides a signal corresponding to the reserve fuel at the mission destination. Segment computer 100a has an output providing a signal corresponding to time to $T_1$, segment computer 100b provides a signal corresponding to the remaining time to complete segment two. A summing means 142 adds the time signals from segment computer 100a and segment computer 100b and provides a signal corresponding to the time to $T_2$. Segment computer 100c provides a signal corresponding to the time remaining to complete segment 3. A summing means 143 is connected to summing means 142 and to the segment computer 100c and adds the time to $T_2$ signal to the time remaining for segment 3 signal and provides a signal corresponding to the time to destination.

Segment computer 100a has an output that provides a signal corresponding to present gross weight divided by density ratio to two memory devices 144 and 145. Memory devices 144 and 145 have information stored therein corresponding to the loiter and cruise curves shown in FIG. 12. Devices 144 and 145 are responsive to the gross weight divided by density ratio signal to provide signals corresponding to the mach numbers for most efficient loiter and cruise, respectively. A transformer 146 is used to add the mach bias signal to the mach signal from device 145 to increase the mach signal in accordance with the desired high speed range trade off. Deck 36a of switch 36 switches the mach command signal to either loiter or cruise mode.

Figure 21:
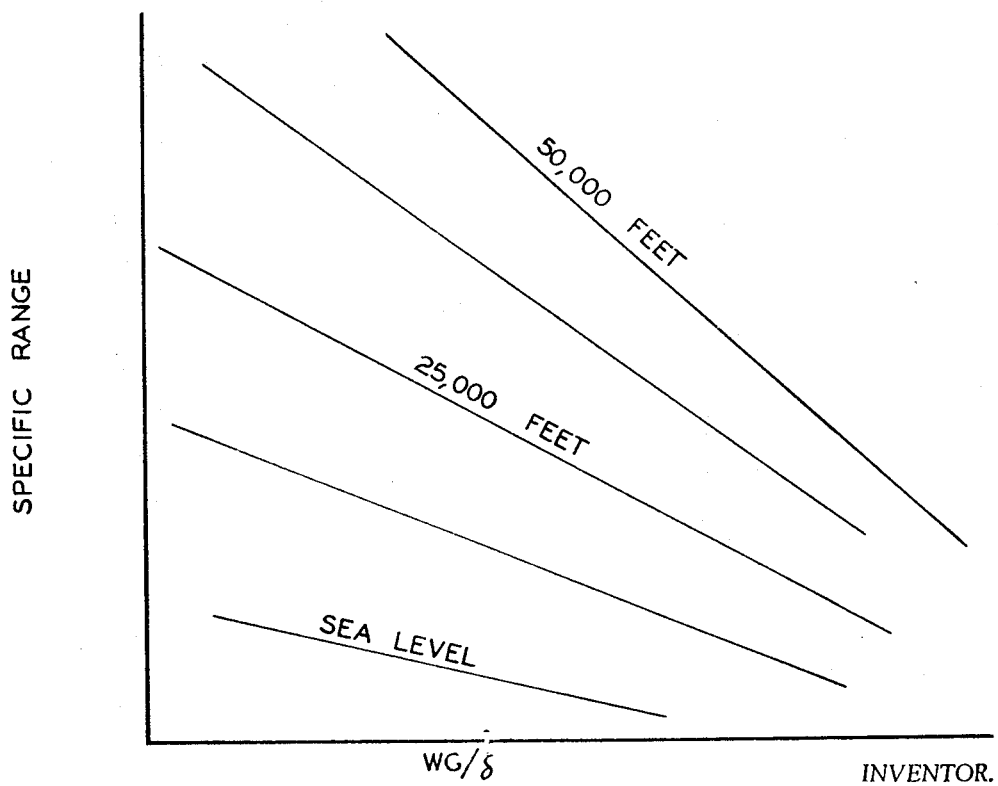
FIG. 21 shows a collection of curves at various altitudes having specific range plotted against weight and density ratio.

A memory device 147 is excited by a signal corresponding to actual altitude and has information stored therein corresponding to the curves shown in FIG. 21, the slope of the curves vary in corresponding relation with the actual altitude excitation. Memory device 147 is responsive to the gross weight divided by density ratio signal to provide a signal corresponding to specific range at the actual altitude and the mach number determined by the gross weight divided by density ratio signal.

An ADD circuit 148 is connected to the memory device 147 and receives the specific range signal therefrom. A switching circuit 149 is connected to segment computers 100a, 100b and 100c and receives the specific range loss signals therefrom. Switching circuit 149 has an output providing a signal corresponding to the specific range loss for the engaged segment. ADD circuit 148 is also connected to the output of switching circuit 149 and sums the specific range signal with the specific range loss signal to provide a signal corresponding to the actual specific range for the engaged segment. An inverting and multiplication circuit 150 is connected to ADD circuit 148 and receives the signal therefrom and also receives an airspeed signal from the central air data computer. Circuit 150 inverts the specific range signal to pounds per mile and multiplies it by the airspeed signal in miles per hour to obtain a signal corresponding to rated pounds per hour of fuel consumption. A subtract circuit 151 is connected to circuit 150 and receives the fuel consumption signal therefrom. It also receives the actual engine fuel flow signal in pounds per hour. Subtract circuit 151 subtracts the actual engine fuel flow from the rated fuel consumption and provides a signal corresponding to the difference. nA level detector 152 receives the difference signal and provides a high or low fuel consumption warning if the difference signal exceeds a specified level.

From equation 13 it can be seen that the maximum range is a function of both altitude and gross weight. To achieve maximum range, altitude should gradually increase as the aircraft gross weight decreases. Memory devices 153, 154, 155 and 156 have optimum altitude versus gross weight information stored therein. The memory devices are connected to the present gross weight signal from the segment 1 computer and have outputs providing signals corresponding to the optimum altitude. Memory devices 153 and 155 have information for a normal aircraft configuration while devices 154 and 156 have information for an engine out configuration. Memory devices 153 and 154 are also programmed for the cruise mode of operation while memory devices 155 and 156 are programmed for the loiter mode. Switches 157 and 158 have common terminals normally connected to memory devices 153 and 155, respectively, and are responsive to the engine out commands from the Mission Definition Panel to switch to memory devices 154 and 156. Deck 36b of switch 36 switches to the memory device for either the cruise or loiter mode and provides an optimum altitude command for the desired mode. Thus deck 36b provides a signal corresponding to the optimum altitude for either cruise or loiter mode and for either a normal or an engine out aircraft configuration.

The altitude and mach command signals remain valid throughout the entire mission and are not dependent upon which target is engaged. The present gross weight signal from segment computer 100a remains current because the segment dry weight signal for the engaged segment is connected to segment computer 100a through switches 40 and 42. Thus the need for additional memory devices to compute the optimum altitude and mach commands for segments two and three is eliminated.

The Strike Assurance System can accommodate a mission having four preselected mission points in a prescribed sequence of the point of departure, target $T_1$, target $T_2$ and destination. The two targets may be scrubbed or reversed in sequence or additional targets may be substituted in place of the planned targets. The four mission points provide three separate segments which may be flown at any variation of altitude or speed and with any combination of weapon stores. The system is adaptable to engine failures, battle damage, requirement to loiter while waiting for weather clearance and the introduction of a target of opportunity. The system predicts the time and range to each mission point and commands the pilot to the optimum altitudes and airspeeds for each segment. The system also monitors reserve fuel supply and provides a warning of battle damage or deficient engine operation. All computer commands and predictions are continuously updated to correct for prior mission deviations. Thus the pilot has available all the necessary flight parameters to successfully complete a mission.

What is claimed is:

1. Strike Assurance System for an aircraft assigned to a mission having specified targets, comprising:
   a navigational subsystem for providing signals corresponding to navigational commands necessary to complete the mission;
   a fuel management subsystem for providing signals corresponding to optimum flight parameters; and
   computing means connected to the navigational and fuel management subsystems and responsive to the signals therefrom for providing output signals to determine if the mission may be successfully completed.

2. A system as described in claim 1, in which the computing means provides a signal corresponding to a forecast of fuel reserves to determine if enough fuel is available to complete the mission.

3. A system as described in claim 2, additionally comprising indicating means responsive to the reserve fuel signal for indicating the reserve fuel.

4. A system as described in claim 2, in which:
   the navigational subsystem provides signals corresponding to range to each target, target bearing and actual wind velocity and direction; and
   the fuel management subsystem provides signals corresponding to optimum airspeed and fuel weight.

5. A system as described in claim 1, in which the computing means provides a signal corresponding to time to each target to determine if the mission can be completed within a required time.

6. A system as described in claim 5, in which:
   the navigational subsystem provides signals corresponding to range to each target, target bearing and actual wind velocity and direction; and
   the fuel management subsystem provides signals corresponding to optimum airspeed and fuel weight.

7. A system as described in claim 5, additionally comprising indicating means responsive to the time to target signals for indicating the time to each target.

8. A system as described in claim 1, additionally comprising signal means for providing signals corresponding to planned mission parameters, the navigational and fuel management subsystems being connected thereto and responsive to the signals therefrom.

9. A system as described in claim 8, in which the signal means additionally includes means for providing signals corresponding to actual flight parameters so that the computing means updates the output signals during flight.

10. A system as described in claim 9, in which the fuel management subsystem additionally comprises:
means for providing a signal corresponding to an engine failure; and
means responsive to the engine failure signal for causing the fuel management subsystem to provide signals corresponding to optimum flight parameters with one engine failed.

11. A system as described in claim 1, in which the fuel management subsystem provides signals corresponding to optimum flight parameters to obtain maximum range.

12. A system as described in claim 11, additionally comprising:
means for providing a signal corresponding to a range trade off for additional airspeed; and
means responsive to the range trade off signal for compensating the computing means output signals for the effects of increased airspeed.

13. A system as described in claim 1, in which the fuel management subsystem provides signals corresponding to optimum flight parameters to obtain maximum endurance.

14. A system as described in claim 1, in which the optimum flight parameter signals provided by the fuel management subsystem comprise signals corresponding to optimum altitude and airspeed.

15. A system as described in claim 14, additionally comprising means for interrogating the computing means to determine the effects of flying at an alternate altitude.

16. A system as described in claim 14, in which the airspeed signal corresponds to mach number.

17. A system as described in claim 1, additionally comprising means responsive to the navigational command signals and the optimum flight parameter signals for indicating the navigational commands and the optimum flight parameters.

18. A system as described in claim 1, in which:
the navigational subsystem provides signals corresponding to range to each target, present position, target bearing, actual heading, heading command and actual wind velocity and direction;
the fuel management subsystem provides signals corresponding to optimum altitude, optimum airspeed, fuel weight fuel sight warning and improper fuel consumption; and
the computing means provide signals corresponding to reserve fuel and time to each target.

19. A system as described in claim 18, additionally comprising means responsive to the signals for indicating reserve fuel, time to each target, range to each target, present position, target bearing, actual heading, heading command, actual wind velocity and direction, optimum altitude, optimum airspeed, fuel weight, fuel weight warning and improper fuel consumption.

20. A Strike Assurance System for an aircraft assigned to a mission having specific mission points, namely, point of departure, targets and destination, forming mission segments, comprising:
a mission definition panel having means for providing signals corresponding to mission point locations, planned altitude and estimated wind conditions for each segment;
a control panel having means for providing signals corresponding to a airframe weight and point engage commands;
signal means for providing signals corresponding to total fuel weight fuel flow, inertial position, inertial ground speed, actual altitude, true airspeed and actual heading;
computing means connected to the mission definition panel, the control panel and the signal means and responsive to the signals therefrom for providing signals corresponding to optimum altitude and mach number for maximum efficiency, reserve fuel weight, time to each point and heading command for each segment; and
indicating means responsive to the signals from the computing means for indicating optimum altitude and mach number for maximum efficiency, reserve fuel weight actual heading, time to each point and heading command.

21. A STRIKE Assurance system for an aircraft assigned to a mission having specific mission points, namely point of departure, targets and destination, forming mission segments, comprising;:
a mission definition panel having means for providing signals corresponding to mission point locations, planned altitude, estimated wind conditions, high speed range trade off, engine failure, weapon deployment and wing tank release for each segment;
a control panel having means for providing signals corresponding to airframe weight, point engage commands;
signal means for providing signals corresponding to total fuel weight, fuel flow, inertial position, inertial ground speed, actual altitude, true airspeed and actual heading;
computing means connected to the mission definition panel, the control panel and the signal means for receiving the signals therefrom and responsive to the signals for providing signals corresponding to present position, range for each segment, time to each point, optimum altitude and mach number for maximum range, total fuel weight, reserve fuel weight, actual wind velocity and direction for the engaged segment, bearing and heading command for each segment and actual heading for the engaged segment;
an altitude indicator connected to the computing means and responsive to the optimum altitude signal for providing an indication of the optimum altitude;
an airspeed indicator connected to the computing means and responsive to the mach number signal for providing an indication of the optimum mach number;
a position indicator connected to the computing means and responsive to the present position signals and range signals for indicating the present position and the range to each point;
an indicator connected to the computing means and responsive to the total fuel weight signal, reserve fuel weight signal and the time signals for indicating the total fuel weight, reserve fuel weight and time to each point; and
a heading command indicator connected to the computing means and responsive to the target bearing, heading command, actual heading, actual wind velocity and wind direction signals for indicating target bearing, heading command, actual heading, actual wind velocity and wind direction for the engaged segment.

22. A system as described in claim 21, in which the computing means additionally comprises means for providing signals corresponding to optimum altitude and mach number for maximum endurance.

23. A system as described in claim 22, in which the control panel additionally includes means for selecting an indication of optimum altitude for maximum range or maximum endurance on the altitude indicator.

24. A system as described in claim 21, additionally comprising means for determining the effect on the reserve fuel indication caused by reversing target sequence.

25. A system as described in claim 21, additionally comprising means for determining the effects of scrubbing a target on the reserve fuel indication.

26. A system as described in claim 21, additionally comprising means for determining the effects of flying at an alternate altitude on the reserve fuel and time to target indication.

27. A system as described in claim 21, additionally comprising means responsive to the fuel flow signal for providing an indication of improper fuel consumption.

28. A system as described in claim 21, additionally comprising means responsive to the fuel weight signal for providing a fuel weight warning signal.

29. A Strike Assurance System as described in claim 21, in which the computing means comprises:
a navigational subsystem connected to the mission definition panel, the control panel and the signal means for receiving the mission point location signals, the estimated wind signals, the point engage commands, the inertial position and ground speed signals, planned airspeed signals and the true airspeed and heading signals for providing signals corresponding to range for each segment, air range for each segment, bearing and heading command for each segment, actual heading, wind velocity and wind direction for the engaged segment; and
a fuel management subsystem connected to the navigational subsystem, the control panel, the signal means and the mission definition panel and receiving the planned altitude, actual altitude, range trade off, weapon deployment, wing tank release, airframe weight total fuel weight, fuel flow, ambient temperature and target and destination engage commands for providing signals corresponding to time to each point, optimum altitude and mach number for maximum range, total fuel weight, reserve fuel weight and planned airspeed.

30. A system as described in claim 29, in which the navigational subsystem includes means responsive to a signal indicating a failure of the inertial signals for combining the estimated wind signals, the true airspeed signal and the actual heading signal to provide a ground speed signal and integrating the ground speed signal over elapsed time to provide a standby present position signal for use in place of the inertial position signal.

31. A system as described in claim 29, in which the mission point location signals and the inertial position signals are signals corresponding to longitude and latitude of the mission points and the inertial position.

32. A system as described in claim 31, in which the navigational subsystem comprises:
a first switching means receiving the signals corresponding to longitude and latitude of the mission points and the inertial position and responsive to the engage commands for substituting the inertial position signal for a mission point signal when a subsequent mission point is engaged and having outputs providing the mission point and inertial position signals;
servo means connected to the outputs of the first switching means and responsive to the signals therefrom for providing mechanical displacements corresponding to the latitudes of the inertial position and subsequent mission points, a displacement corresponding to a difference between the longitude of the inertial position and the longitude of the subsequent point and displacements corresponding to differences in longitudes of subsequent segments;
resolver chains for each segment connected to the servo means and responsive to the mechanical displacements for providing signals corresponding to bearing and range for the mission segments;
means receiving the inertial ground speed signals, the heading signal and the true airspeed signal for resolving the airspeed signal into north-south and east-west components and subtracting the components from the inertial ground speed signals to provide signals corresponding to the components of the wind velocity;
means receiving the wind velocity component signals for combining the component signals and providing signals corresponding to wind velocity and direction;
a second switching means receiving the wind velocity component signals, the true airspeed signal, the planned airspeed signals, and the estimated wind condition signals and having outputs providing signals corresponding to planned airspeed and estimated wind conditions for each mission segment, the switching means responsive to the engage commands for substituting the actual airspeed signal in place of the planned airspeed signal and the wind velocity component signals for the estimated wind condition signals for the engaged mission segment; and
computing means for each segment connected to the second switching means and the corresponding segment resolver chain responsive to the bearing, range, airspeed and wind component signals for providing signals corresponding to segment heading command and segment air range.

33. A system as described in claim 32, in which the computing means comprises:
an airspeed resolver having a rotor excited by the airspeed signal and positioned to correspond to a heading command and stators receiving the wind component signals and having signals induced therein corresponding to airspeed components whereby the wind and airspeed components are added to provide signals corresponding to ground speed components;
a ground speed resolver has stators connected to the stators of the airspeed resolver and excited by the ground speed component signals therefrom and a first rotor positioned in accordance with the bearing signal has induced therein a signal corresponding to an error between the bearing signal and the ground speed components
a motor drivably connected to the rotor of the ground speed resolver and responsive to the error signal to adjust the heading command so that the ground speed component signals correspond to the target bearing;
a second rotor positioned at right angles to the first rotor of the ground speed resolver having a voltage induced therein corresponding to ground speed;
a first potentiometer excited by the airspeed signal and having a wiper positioned in accordance with the range signal from the resolver chain and providing a signal corresponding to the product of ground range and airspeed;
a second potentiometer connected to the second rotor and excited by the signal therefrom and having a wiper providing a signal corresponding to the product of the wiper position and ground speed; and
a servo means connected to the wipers of the first and second potentiometers for comparing the signals therefrom and positioning the wiper of the second potentiometer so that the wiper signals are equal whereby the wiper position of the second potentiometer corresponds to the segment air range.

34. A system as described in claim 29, in which the fuel management subsystem comprises:
means responsive to the fuel flow signals for providing signals corresponding to present fuel weight,
means responsive to the airframe weight, weapon deployment and wing tank release signals for providing signals corresponding to total dry weight for each segment;
computing means for each segment responsive to the planned altitude, actual altitude, segment air range, ambient temperature, a calibrated excitation voltage, total fuel weight at the beginning of the segment, dry aircraft weight and range trade off signals for the associated segment for providing signals corresponding to mach bias, planned airspeed, specific range loss, present gross weight, segment time, total fuel at the segment destination and gross weight divided by density ratio;
means responsive to the gross weigh divided by density ratio signal for providing a signal corresponding to mach number to attain maximum range;
summing means for adding the mach bias signal to the mach number signal to correct the mach signal for high speed range trade off; and
means responsive to the present gross weight signal for providing a signal corresponding to optimum altitude for maximum range.

35. A system as described in claim 34, in which the fuel management subsystem additionally comprises:
means responsive to the actual altitude signal and the gross weight divided by density ratio signal for providing a signal corresponding to specific range;

means responsive to the specific range signal, the specific range loss signals, the engage commands and the true airspeed signal for providing a signal corresponding to rated fuel consumption; and means for comparing the rated fuel consumption signal with the fuel flow signal and providing a warning if the fuel flow is improper.

36. A system as described in claim 34, additionally comprising:

means for connecting the computing means for the first segment to the dry aircraft weight signal means for the engaged segment, whereby the present gross weight signal from the first segment computing means remains current as subsequent segments are engage and the optimum altitude signal is valid throughout the mission.

37. A system as described in claim 34, in which the computing means for each segment comprises:

a first ADD circuit for receiving and summing the total fuel weight and the dry fuel weight signals and providing a signal corresponding to present gross weight;

a second ADD circuit for receiving and summing the dry fuel weight signal and a destination reserve fuel weight signal and providing a signal corresponding to destination gross weight;

a first and second memory devices receive the high speed range trade off signal and the calibrated excitation voltage and provide signals corresponding to specific range loss and mach bias;

first and second attenuation means responsive to the high speed angle trade off signal and an altitude signal for attenuating the calibrated excitation voltage in accordance with the effects of altitude and high speed range trade off on airspeed and specific range respectively and having outputs providing first and second attenuated excitations;

third memory device responsive to the first attenuated excitation and the present gross weight signal for providing a signal corresponding to time at the present gross weight;

fourth memory device responsive to the first attenuated excitation and the destination gross weight signal for providing a signal corresponding to time at the destination gross weight;

means responsive to the signals from the third and fourth memory devices and the ambient temperature signal for providing a signal corresponding to segment time;

fifth memory device responsive to the second attenuated excitation and the present gross weight signal for providing a signal corresponding to air range at the present gross weight;

sixth memory device responsive to the second attenuated excitation and the destination gross weight signal for providing a signal corresponding to air range at the destination gross weight;

means responsive to the signals from the fifth and sixth memory devices and the air range signal from the navigational subsystem for providing a signal corresponding to reserve fuel weight;

means responsive to the altitude signal and the present gross weigh signal for providing a signal corresponding to gross weight divided by density ratio; and means responsive to the altitude signal and the gross weight divided by density ratio signal for providing a signal corresponding to planned airspeed.